(12) United States Patent
Soryal et al.

(10) Patent No.: US 12,126,634 B2
(45) Date of Patent: *Oct. 22, 2024

(54) INSTALLABLE MUTABLE INTELLIGENT SECURITY PACKAGE AND SECURITY SYSTEM IN INTERNET OF THINGS NETWORKS

(71) Applicant: AT&T Intellectual Property I, L.P., Atlanta, GA (US)

(72) Inventors: Joseph Soryal, Glendale, NY (US); Naila Jaoude, Eatontown, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/090,569

(22) Filed: Dec. 29, 2022

(65) Prior Publication Data
US 2023/0140098 A1 May 4, 2023

Related U.S. Application Data

(63) Continuation of application No. 16/885,376, filed on May 28, 2020, now Pat. No. 11,575,690.

(51) Int. Cl.
*H04L 9/40* (2022.01)
*G06F 8/61* (2018.01)
(Continued)

(52) U.S. Cl.
CPC ............ *H04L 63/1416* (2013.01); *G06F 8/62* (2013.01); *H04L 63/0869* (2013.01); *H04L 67/12* (2013.01); *G16Y 30/10* (2020.01)

(58) Field of Classification Search
CPC . H04L 63/1416; H04L 63/0869; H04L 67/12; H04L 63/1433; H04L 67/34; G06F 8/62; G06F 8/61; G16Y 30/10
See application file for complete search history.

(56) References Cited

U.S. PATENT DOCUMENTS

2018/0060153 A1* 3/2018 Innes ...................... H04L 41/06
2020/0278915 A1* 9/2020 Degaonkar ........... H04L 41/069
(Continued)

OTHER PUBLICATIONS

U.S. Office Action dated May 25, 2022 in U.S. Appl. No. 16/885,376.
(Continued)

*Primary Examiner* — Jung H Park
(74) *Attorney, Agent, or Firm* — Hartman & Citrin LLC

(57) ABSTRACT

Concepts and technologies disclosed herein are directed to an installable mutable intelligent security package ("IMISP") and security system in Internet of Things ("IoT") networks. According to one aspect disclosed herein, an IoT device can receive an IMISP. The IMISP can scan a plurality of memory locations of the memory for an IMISP operating system process. In response to finding the IMISP operating system process in a memory location of the plurality of memory locations, the IMISP and the IMISP operating system process can conduct a mutual authentication process. In response to a successful result of the mutual authentication process, the IMISP can self-install in the memory location. The IMISP can then scan the memory of the IoT device for an anomaly. In response to finding the anomaly, the IMISP can generate a report that includes information associated with the anomaly.

20 Claims, 12 Drawing Sheets

(51) Int. Cl.
*G16Y 30/10* (2020.01)
*H04L 67/12* (2022.01)

(56) References Cited

U.S. PATENT DOCUMENTS

2020/0285779 A1* 9/2020 Foltin .................... G06N 3/088
2020/0336895 A1* 10/2020 Bartlett ................ H04L 9/3247

OTHER PUBLICATIONS

U.S. Notice of Allowance dated Sep. 14, 2022 in U.S. Appl. No. 16/885,376.

* cited by examiner

INSTALLABLE MUTABLE INTELLIGENT SECURITY PACKAGE AND SECURITY SYSTEM IN INTERNET OF THINGS NETWORKS

CROSS-REFERENCE TO RELATED APPLICATIONS

This application is a continuation of and claims priority to U.S. patent application Ser. No. 16/885,376, entitled "Installable Mutable Intelligent Security Package and Security System in Internet of Things Networks," filed May 28, 2020, now U.S. Pat. No. 11,575,690, which is incorporated herein by reference in its entirety.

BACKGROUND

The Internet of Things ("IoT") is a concept of making physical objects, collectively "things," network addressable to facilitate interconnectivity for the exchange of data. IoT represents a significant business opportunity for service providers. Industry standards for the IoT infrastructure are currently in flux. To realize the lucrative promise of this new industry, issues associated with network capacity, forensic accountability, and data security must be addressed.

The cost, size, and power define the design and functional limits of traditional IoT sensors. These sensors are small, which means that they have small processors, and, for this reason, do not have the cryptographic stack typically utilized in a general purpose computer. Services such as data encryption therefore are not often available for IoT sensors. As more and more IoT sensors are deployed, the security implications of insecure data exchange among IoT sensors becomes increasingly problematic. The future success of the IoT industry depends largely on the implementation of proper security features to eliminate insecure data exchanges among other security vulnerabilities.

Many current IoT devices depend on edge networking configurations in which a single, local node manages clusters of IoT devices. The communications routes used by IoT devices in edge networking configurations typically do not vary over time. This further increases security vulnerabilities and can aid malicious attackers in intercepting IoT data. Moreover, many IoT devices depend on security applications that are permanently installed and easily detected and isolated by intelligent malware.

The next evolution of IoT architecture includes heterogeneous IoT devices, such as devices from different makes/models with different functionality that can coexist and communicate with each other. Some future IoT devices will have the capability to communicate directly with remote management centers that bypass local nodes. Moreover, some IoT devices may support mid-operation changes in which sensors can be repurposed using software defined components to collect different types of data. Current IoT security mechanisms cannot adapt to these evolutions in IoT technology.

SUMMARY

Concepts and technologies disclosed herein are directed to an installable mutable intelligent security package ("IMISP") and security system in Internet of Things ("IoT") networks. According to one aspect of the concepts and technologies disclosed herein, an IoT device can receive an IMISP. The IMISP can scan a plurality of memory locations of the memory for an IMISP operating system process. In response to finding the IMISP operating system process in a memory location of the plurality of memory locations, the IMISP and the IMISP operating system process can conduct a mutual authentication process. In response to a successful result of the mutual authentication processor, the IMISP can self-install in the memory location. The IMISP can then scan the memory of the IoT device for an anomaly. In response to finding the anomaly, the IMISP can generate a report that includes information associated with the anomaly.

The IoT device can receive the IMISP from an IMISP system that operates external to an IoT network on which the IoT device operates. The IoT network can include a plurality of IoT devices, including the IoT device. The IoT network can be a homogenous or a heterogeneous network.

The IMISP system can generate the IMISP based upon an IoT profile. The IoT profile can contain information about a particular IoT device or group of IoT devices having the same manufacture, model, compatible communication protocol(s), functionality, and/or the like. In some embodiments, the IoT profile may be applied to a group of IoT devices associated with a range or group of serial numbers or other unique identifiers specified by the manufacturer. Alternatively, in some embodiments, the IoT profile may be applied to IoT devices within a range or group of other identifiers such as physical network addresses (e.g., media access control address). The IoT profile may be heterogeneous in that it is applicable to a group of IoT devices manufactured by different manufacturers and that provide the same or similar functionality. In some embodiments, the IMISP is based on a plurality of IoT profiles to account for all IoT devices operating within a given IoT network. Multiple IMISPs are also contemplated.

In some embodiments, the IMISP can be sent by the IMISP system to the IoT device via a protocol, such as hypertext transfer protocol ("HTTP"), file transfer protocol ("FTP"), and the like. In some embodiments, the IMISP system can intercept data traffic directed to the IoT device and inject the IMISP into the data traffic. In some other embodiments, the IMISP system can send the IMISP to the IoT device among dummy data generated by the IMISP system, such as randomly-generated data corresponding to the data type(s) typically utilized by the IoT device (e.g., certain sensor data such as temperature readings).

In some embodiments, the IMISP can determine if an IoT device operator associated with the IoT device should be notified of the anomaly. In some embodiments, the IoT device operator can request anomaly notifications as part of a security service provided by the IMISP system. In response to such a request, the IMISP system can create an IMISP that includes instructions to notify the IoT device operator if an anomaly is found. In response to determining that the IoT device operator associated with the IoT device should be notified of the anomaly, the IMISP can notify the IoT device operator of the anomaly. In other embodiments, notifying the IoT device operator is a default IMISP operation. Alternatively, the IMISP can be configured not to provide anomaly notifications.

In some embodiments, the IMISP can determine if a remedial action should be attempted to remediate the anomaly. In response to determining that the remedial action should be attempted to remediate the anomaly, the IMISP can attempt the remedial action to remediate the anomaly. The IMISP can determine if the remedial action was successful. The IMISP can generate the report based, at least in part, on a result of the remedial action. The report can indicate whether or not the anomaly was successfully remediated by the remedial action. Alternatively, the report can include an indication that the anomaly was detected but no remedial action was taken.

After the IMISP generates the report, the IMISP can self-uninstall from the memory location of the IoT device. The IMISP can encapsulate in traffic directed to a further IoT device operating in the IoT network. The IMISP can move from the IoT device to the further IoT device amongst the traffic. Upon arrival at the further IoT device, the IMISP can instruct the further IoT device to send the report that was previously generated for the IoT device to the IMISP system.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
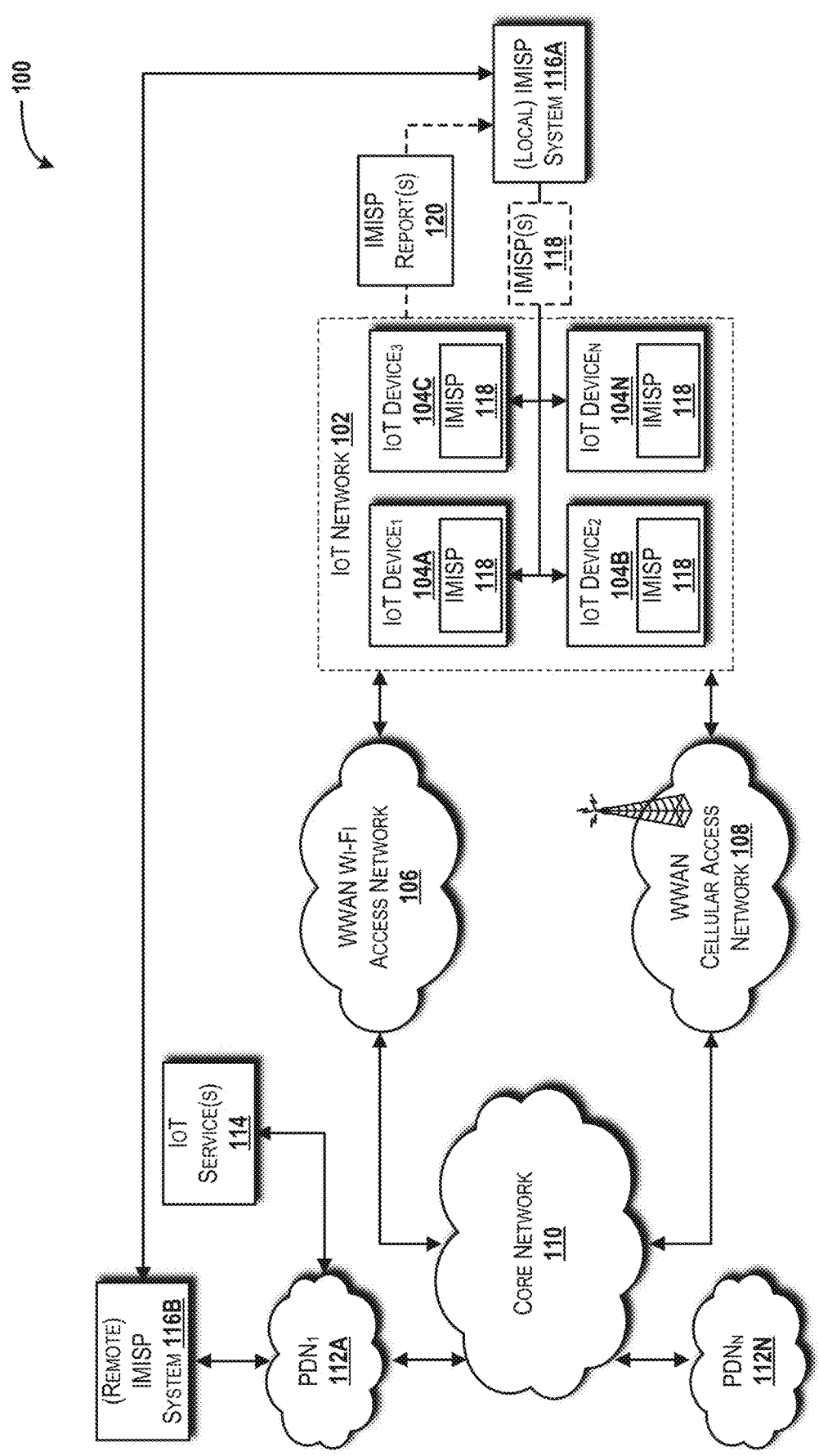
FIG. 1 is a block diagram illustrating an illustrative operating environment for various embodiments of the concepts and technologies described herein.

The concepts and technologies disclosed herein are directed to an installable mutable intelligent security package ("IMISP") and security system in Internet of Things ("IoT") networks. The IMISP can hop among a plurality of IoT devices operating as part of an IoT network. The IMISP is installable on-the-fly on IoT device operating systems. The IMISP can provide an additional layer of protection for traditional IoT security methods. The IMISP can be temporarily installed on an IoT device to avoid detection by malware. In this manner, the IMISP behaves like a software virus to avoid detection. The IMISP can move from one IoT device to another amongst regular peer-to-peer data traffic similar to a software virus infection. The IMISP can encapsulate itself in a data traffic sent via a protocol such as HTTP or FTP to avoid detection. After the IMSIP arrives at an IoT device, the IMISP can self-install. The IMISP can self-install in a new memory location each time, so the IMISP does not exhibit any particular behavior or pattern.

Each participant IoT device can be configured with an operating system process that is designed to recognize the IMISP and grant the IMSIP root access to the IoT device. The operating system process can include information about IMISP packages. After an IMISP arrives at and is accessed by an IoT device, the IMISP can contact the operating system process running on the operating system. In response, the operating system process can call the IMISP to be executed to be self-installed. In some embodiments, the IMISP and the operating system process can each share a password and/or or authentication information with the other for mutual authentication. Upon successful authentication, the IMISP can be invoked by the operating system process and allowed to run.

After the IMISP is installed on an IoT device, the IMISP can perform a scan to identify the make, model, components, and/or other information that identifies the IoT device. The IMISP can utilize an IoT profile that is matched to this information to identify one or more security modules of the IoT device. The IMISP can then perform a system scan and ad-hoc traffic checks to determine whether any anomalies exist. If an anomaly is found, the IMISP can take remedial action and/or alert one or more entities, such as an IoT operator associated with the IoT device. After all anomalies are addressed (either via remedial action and/or alert), the IMISP can self-uninstall and move to another IoT device. The IMISP can continue this process for all remaining IoT devices in an IoT network. Alternatively, the IMISP can be instructed to engage with a specific number of IoT devices in the IoT network. The IMISP may also be instructed to end the process at any time.

The IMISP may install on a bad IoT device, such as an IoT device that has been compromised by a malicious entity such as a hacker. The bad IoT device may discard the IMISP. In this case, an external IMISP system can determine that the IMISP did not travel to another IoT device and will know that the last IoT device on which the IMISP was installed was the IoT device from which the IMISP disappeared.

In addition to determining whether any anomalies exist, the IMISP can log all events and findings during its tenure installed on the IoT device. The IMISP can report these logs along with any anomalies to the external IMISP system. In some embodiments, the external IMISP system can be a centralized system that communicates with multiple IoT networks. Alternatively, the external IMISP system can be a local system that operates in proximity to an IoT network, such as part of an enterprise. The local system may communicate with a centralized system. The IMISP can report to the external system after it leaves an IoT device. For example, after the IMISP leaves a first IoT device and travels successfully to a second IoT device, the IMISP can self-install and direct the second IoT device to send the report for the first IoT device to the external system.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, vehicles, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of the concepts and technologies disclosed herein for an IMISP and security system in IoT networks will be described.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 includes an IoT network 102 that contains a plurality of IoT devices 104A-104N (hereinafter collectively and/or generically referred to as "IoT devices 104"). Each of the IoT devices 104 can be configured to operate on and communicate with a wireless wide area network ("WWAN") WI-FI access network 106, a WWAN cellular access network 108, or both. Moreover, the IoT devices 104 can communicate among each other using technologies such as Institute of Electrical and Electronics Engineers ("IEEE") 802.15.1 (commonly known as BLUETOOTH low energy or BLE), IEEE 802.11ah (Ha-Low), other short-range communications technologies, other IoT-specific technologies, combinations thereof, and the like. In some embodiments, the IoT devices 104 are geographically distributed such that communications among at least some of the IoT devices 104 are handled via the WWAN WI-FI access network 106, the WWAN cellular access network 108, or both. It should be understood that as IoT technologies continue to mature, new communications protocols likely will be developed and improve upon existing technologies. The concepts and technologies disclosed herein are not limited to any particular technology(ies). Accordingly, the example technologies described herein should not be construed as being limiting in any way.

The IoT devices 104 can be or can include any "thing" that can collect data and that is configured to be network addressable so as to connect to and communicate with one or more networks, such as the WWAN WI-FI access network 106 and/or the WWAN cellular access network 108, over which to communicate the data to other connected devices, including, for example, computers, smartphones, tablets, vehicles, other computing devices, other IoT devices, combinations thereof, and the like. The IoT devices 104 can be deployed for consumer use, business use, government use, and can find application in many industry-specific use cases. For example, the IoT devices 104 may find at least partial application in the following industries: automotive, energy, healthcare, industrial, retail, and smart buildings/homes. Those skilled in the art will appreciate the applicability of IoT-solutions disclosed herein to other industries as well as consumer and business use cases. For this reason, the applications of the IoT devices 104 described herein are used merely to illustrate some example applications, and therefore should not be construed as being limiting in any way.

Each of the access networks, including the WWAN WI-FI access network 106 and the WWAN cellular access network 108, can include one or more service areas. The WWAN cellular access network 106, for example, can be divided into a plurality of cells having the same or different cell sizes, which may be represented by different cell-types. As used herein, a "cell" refers to a geographical area that is served by one or more base stations operating within an access network. As used herein, a "base station" refers to a radio receiver and/or transmitter (collectively, transceiver) that is/are configured to provide a radio/air interface over which one or more devices, such as the IoT devices 104, can connect to an access network, such as the WWAN WI-FI access network 106 and/or the WWAN cellular access network 108. Accordingly, a base station is intended to encompass one or more base transceiver stations ("BTSs"), one or more Node-Bs, one or more eNode-Bs, one or more home eNodeBs, one or more gNodeBs, one or more wireless access points (e.g., WI-FI access points), one or more multi-standard metro cell ("MSMC") nodes, and/or other networking nodes or combinations thereof that are capable of providing a radio/air interface regardless of the technologies utilized to do so. A base station can be in communication with one or more antennas (not shown), each of which may be configured in accordance with any antenna design specifications to provide a physical interface for receiving and transmitting radio waves to and from one or more devices, such as the IoT devices 104.

A cell-type can be associated with certain dimensional characteristics that define the effective radio range of a cell. A cell-type can additionally represent the radio access technology ("RAT") utilized by a cell. Cell-types can include, but are not limited to, a macro cell-type, a metro cell-type, a femto cell-type, a pico cell-type, a micro cell-type, WLAN cell-type, a MSMC cell-type, and a white space network cell-type. For ease of explanation, a "small cell" cell-type is utilized herein to collectively refer to a group of cell-types that includes femto cell-type (e.g., home eNodeB), pico cell-type, and micro cell-type, in general contrast to a macro cell-type, which offers a larger coverage area. Other cell-types, including proprietary cell-types, temporary cell-types, and ad-hoc cell-types are also contemplated. An ad-hoc cell-type, for example, can include the IoT device 104, functioning as a "hotspot" for facilitating connectivity for other devices, such as another IoT device 104, to connect to another potentially larger cell.

The WWAN cellular access network 108 may operate in accordance with one or more mobile telecommunications standards including, but not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), millimeter wave ("mmWave"), other current 3GPP cellular technologies, other future 3GPP cellular technologies, combinations thereof, and/or the like. The WWAN cellular access network 108 can utilize various channel access methods (which may or may not be used by the aforementioned standards), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like to provide a radio/air interface to the IoT devices 104. Data communications can be provided in part by the WWAN cellular access network 108 using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, the WWAN cellular access network 108 may be a GSM Radio Access Network ("GRAN"), a GSM EDGE RAN ("GERAN"), a UMTS Terrestrial Radio Access Network ("UTRAN"), an evolved U-TRAN ("E-UTRAN"), any combination thereof, and/or the like. The WWAN WI-FI access network 106 can operate in accordance with IEEE 802.11ah, IEEE 802.11af, or IEEE 802.11ah and IEEE 802.11af, and like standards that support WAN WI-FI.

Figure 10:
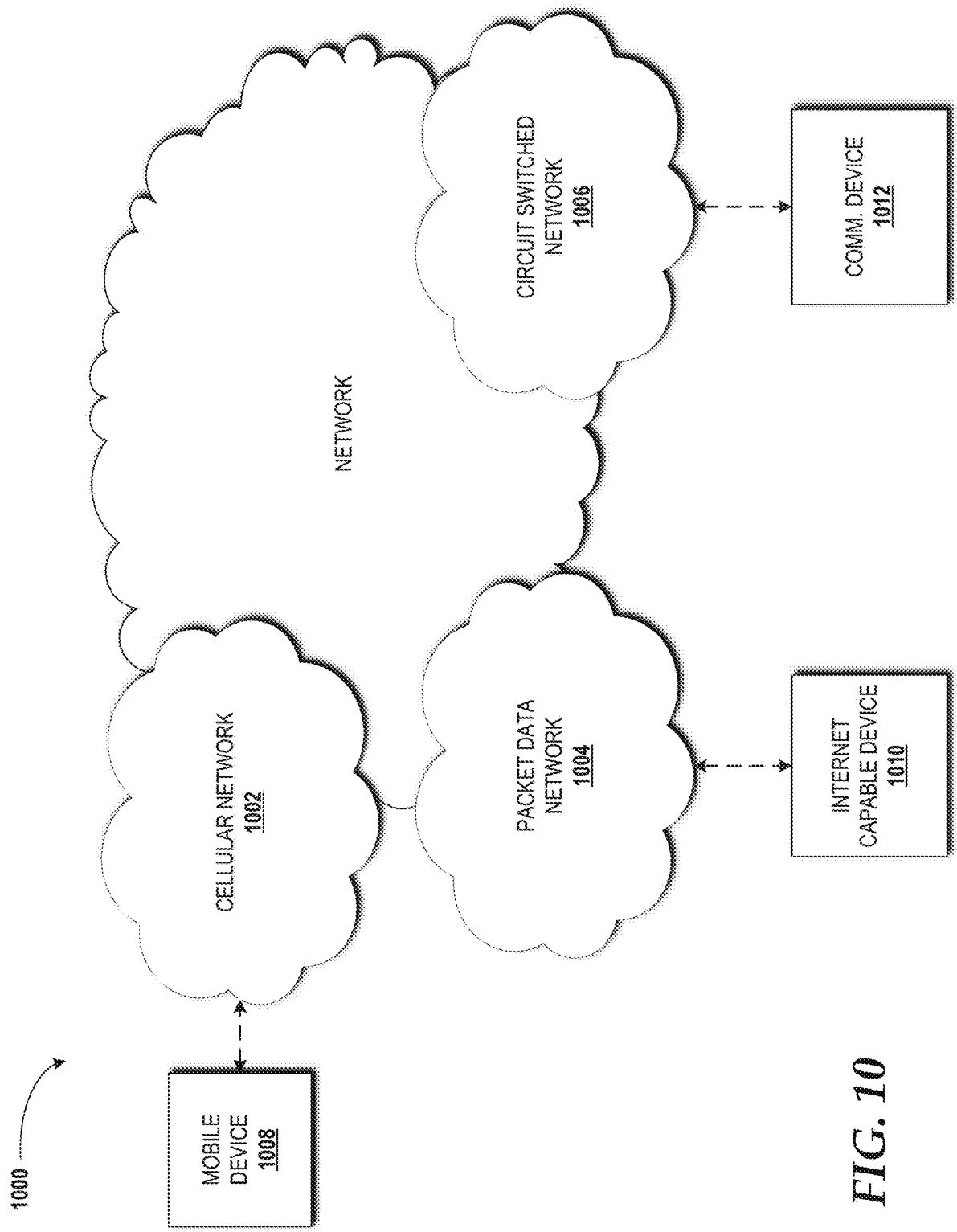
FIG. 10 is a diagram illustrating a network, according to an illustrative embodiment.

The WWAN WI-FI access network 106 and/or the WWAN cellular access network 108 can be part of one or more mobile telecommunications networks that, in addition to providing network access to the IoT devices 104, provide data access to one or more mobile devices, such as cellular smartphones and other cellular-enabled devices (best shown in FIG. 10). As used herein, a mobile telecommunications network includes one or more radio access network ("RANs") (such as the WWAN WI-FI access network 106 and/or the WWAN cellular access network 108) and a WWAN, which may include one or more core networks 110, such as, for example, an evolved packet core ("EPC") network. The core network(s) 110 can include one or more IoT gateways (not shown) that interconnect access points in the WWAN WI-FI access network 106 and the WWAN cellular access network 108 to the core network 110.

The core network 110 embodied as an EPC network can include a mobility management entity ("MME"), a serving gateway ("SGW"), a packet data network ("PDN") gateway ("PGW"), and a home subscriber server ("HSS"). The PDN gateway interconnects the core network 110 and one or more external IP networks, shown in the illustrated embodiments as packet data networks ("PDNs") 112A-112N. The PGW routes IP packets to and from the PDNs 112A-112N. The PDN gateway also performs operations such as IP address/IP prefix allocation, policy control, and charging. In some implementations, the PGW and the SGW are combined. Moreover, IoT gateway functionality may be combined with the PGW and/or the SGW. The HSS is a database that contains user/subscriber information. The HSS also performs operations to support mobility management, call and session setup, user authentication, and access authorization. These concepts can be extended, as applicable, to the IoT devices 104, or alternatively, a dedicated server for IoT devices can be implemented within the core network 110 to handle authentication, authorization, accounting, and/or other aspects.

The PDNs 112A-112N can provide access to one or more IoT services 114. The IoT services 114 can include any consumer and/or business-oriented services. The IoT services 114 can be industry-specific. For example, the IoT services 114 can provide services in the automotive, energy, healthcare, industrial, retail, smart buildings/homes industries, and/or the like. Those skilled in the art will appreciate the applicability of the IoT services 114 to other industries. For this reason, the IoT services 114 described herein are used merely to illustrate some examples, and therefore should not be construed as being limiting in any way.

The illustrated operating environment 100 also includes a local IMISP system 116A and a remote IMISP system 116B (hereinafter collectively and/or generically referred to as IMISP systems 116, or individually as IMISP system 116). The IMISP system 116 can create one or more IMISPS 118 (hereinafter collectively and/or generically referred to as IMISPs 118, or individually as IMISP 118) for distribution to the IoT devices 104. The IMISP 118 contains computer code that can be temporarily installed on the IoT devices 104 to provide an additional layer of protection over traditional IoT security methods and to avoid detection by malware. In this manner, the IMISPs 118 can behave like a software virus. The IMISP 118 can move from one IoT device 104 to another amongst regular peer-to-peer data traffic similar to a software virus infection. The IMISP 118 can encapsulate itself in data traffic to avoid detection. Protocols such as HTTP and FTP are specifically described as example protocols through which the IMISP 118 can be distributed within the IoT network 102, although other protocols are contemplated. The IMISP 118 can self-install on the IoT devices 104. The IMISP 118 can self-install in a new memory location each time it is installed (on the same or different IoT device 104). In this manner, the IMISP 118 does not exhibit any particular behavior or pattern. The IMISP 118 can perform one or more tests to determine if any anomalies exist in association with the operation of the IoT device 104. The tests may be native to the IoT device 104 such as a system scan, performance test, network test, and/or the like. The tests additionally or alternatively may include IMISP tests that are specified in the code of the IMISP 118. The IMISP 118 can report back to the IMISP system 116 the results of the test(s) in one or more IMISP reports 120.

The IMISP report(s) 120 can include information associated with one or more anomalies found by the IMISP 118. After the IMISP 118 generates the IMISP report 120, the IMISP 118 can self-uninstall from a memory location of the IoT device 104. The IMISP 118 can encapsulate in traffic directed to a further IoT device operating in the IoT network 102. The IMISP 118 can move from the IoT device 104 to the further IoT device (e.g., from the IoT device 104A to the IoT device 104B) amongst the traffic. Upon arrival at the further IoT device 104B, the IMISP 118 can instruct the further IoT device 104B to send the IMISP report 120 that was previously generated for the IoT device 104A to the IMISP system 116.

The local IMISP system 116A can operate at the edge of the IoT network 102 and can communicate with the remote IMISP system 116B to perform various operations described herein. The local IMISP system 116A may serve, for example, a home or a business, while the remote IMISP system 116B serves a plurality of homes/businesses, each of which has its own local IMISP system 116A. In other embodiments, only the local IMISP system 116A or only the remote IMISP system 116B is used. The configuration of the IMISP system 116 can be selected based upon the implementation needs of the IoT network 102. As such, the local/remote configuration shown in FIG. 1 should not be construed as being limiting in any way.

It should be understood that some implementations of the operating environment 100 include multiple IoT networks 102, multiple WWAN WI-FI access networks 106, multiple WWAN cellular access networks 108, multiple core networks 110, multiple local IMISP systems 116A, multiple remote IMISP systems 116B, or some combination thereof. Thus, the illustrated embodiment should be understood as being illustrative, and should not be construed as being limiting in any way.

Figure 2:
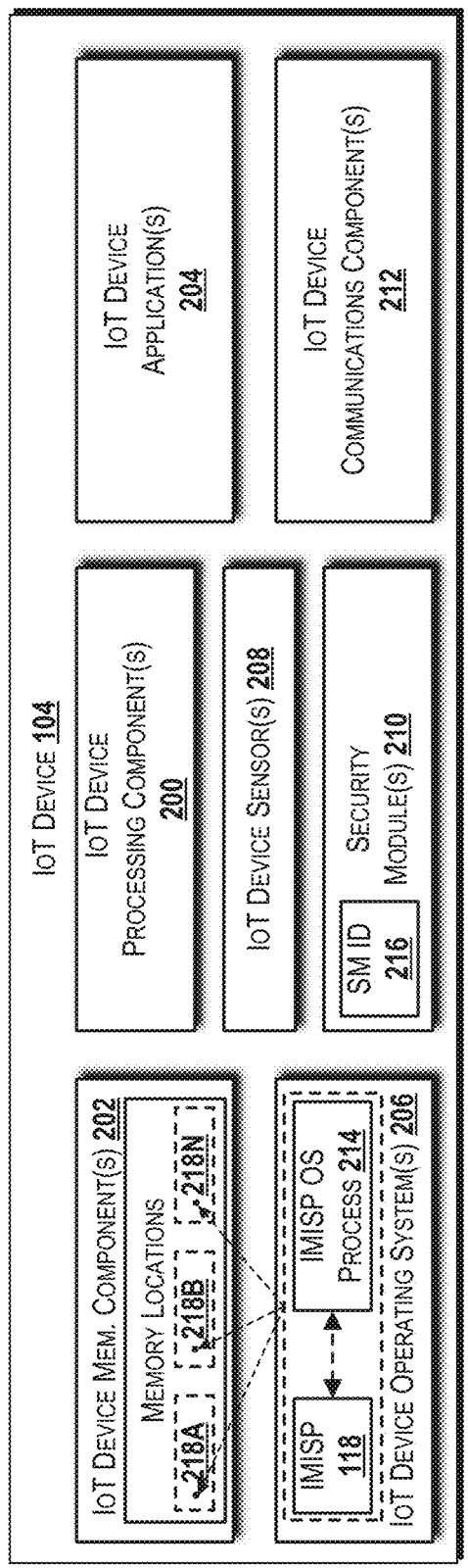
FIG. 2 is a block diagram illustrating an illustrative IoT device for various embodiments of the concepts and technologies described herein.

Turning now to FIG. 2, a block diagram illustrating aspects of an example IoT device 104 and components thereof capable of implementing aspects of the embodiments presented herein will be described. The illustrated IoT device 104 includes one or more IoT device processing components 200, one or more IoT device memory components 202, one or more IoT device applications 204, one or more IoT device operating systems 206, one or more IoT device sensors 208, one or more security modules 210, and one or more IoT device communications components 212. FIG. 2 will be described with additional reference to FIG. 1.

The IoT device processing component 200 (also referred to herein as a "processor") can include one or more hardware components that perform computations to process data, and/or to execute computer-executable instructions of one or more application programs such as the IoT device application(s) 204, one or more operating systems such as the IoT device operating system(s) 206, the IMISP 118, an IMISP operating system process 214, and/or other software. The IoT device processing component 200 can include one or more CPUs configured with one or more processing cores. The IoT device processing component 200 can include one or more GPU configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the IoT device processing component 200 can include one or more discrete GPUs. In some other embodiments, the IoT device processing component 200 can include CPU and GPU components that are configured in accordance with a co-processing CPU/GPU computing model, wherein the sequential part of an application executes on the CPU and the computationally-intensive part is accelerated by the GPU. The IoT device processing component 200 can include one or more SoC components along with one or more other components illustrated as being part of the IoT device 104, including, for example, the IoT device memory component 202. In some embodiments, the IoT device processing component 200 can be or can include one or more SNAPDRAGON SoCs, available from QUALCOMM of San Diego, California; one or more TEGRA SoCs, available from NVIDIA of Santa Clara, California; one or more HUMMINGBIRD SoCs, available from SAMSUNG of Seoul, South Korea; one or more OMAP SoCs, available from TEXAS INSTRUMENTS of Dallas, Texas; one or more customized versions of any of the above SoCs; and/or one or more proprietary SoCs. The IoT device processing component 200 can be or can include one or more hardware components architected in accordance with an ARM architecture, available for license from ARM HOLDINGS of Cambridge, United Kingdom. Alternatively, the IoT device processing component 200 can be or can include one or more hardware components architected in accordance with an x86 architecture, such an architecture available from INTEL CORPORATION of Mountain View, California, and others. Those skilled in the art will appreciate the implementation of the IoT device processing component 200 can utilize various computation architectures, and as such, the IoT device processing component 200 should not be construed as being limited to any particular computation architecture or combination of computation architectures, including those explicitly disclosed herein.

The IoT device memory component 202 can include one or more hardware components that perform storage operations, including temporary or permanent storage operations. In some embodiments, the IoT device memory component 202 can include volatile and/or non-volatile memory implemented in any method or technology for storage of information such as computer-readable instructions, data structures, program modules, the IoT device operating system 206, the IoT device application 204, the IMISP 118, the IMISP operating system process 214, or other data disclosed herein. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store data and which can be accessed by the IoT device processing component 200.

The IoT device application 204 can be executed by the IoT device processing component 200 to perform various IoT operations. For example, the IoT device application 204 can instruct the IoT device sensor(s) 208 to collect data and share the data with the IoT service(s) 114. The IoT device application 204 can execute on top of the IoT device operating system 206. In some embodiments, the IoT device application 204 is provided as firmware.

The IoT device operating system 206 can control the operation of the IoT device 104. In some embodiments, the IoT device operating system 206 includes the functionality of the IoT device application 204. The IoT device operating system 206 can be executed by the IoT device processing component 200 to cause the IoT device 104 to perform various operations. The IoT device operating system 206 can include a member of the SYMBIAN OS family of operating systems from SYMBIAN LIMITED, a member of the WINDOWS OS, WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems or a member of the OS X family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The IoT device sensor(s) 208 can include any sensor type or combination of sensor types utilizing any known sensor technology that is capable of detecting one or more characteristics of an environment in which the IoT device 104 is deployed. More particularly, the IoT device sensor(s) 208 can include, but are not limited to, lighting control sensor, appliance control sensor, security sensor, alarm sensor, medication dispenser sensor, entry/exit detector sensor, video sensor, camera sensor, alarm sensor, motion detector sensor, door sensor, window sensor, window break sensor, outlet control sensor, vibration sensor, occupancy sensor, orientation sensor, water sensor, water leak sensor, flood sensor, temperature sensor, humidity sensor, smoke detector sensor, carbon monoxide detector sensor, doorbell sensor, dust detector sensor, air quality sensor, light sensor, gas sensor, fall detector sensor, weight sensor, blood pressure sensor, IR sensor, HVAC sensor, smart home sensor, thermostats, other security sensors, other automation sensors, other environmental monitoring sensors, other healthcare sensors, multipurpose sensor that combines two or more sensors, the like, and/or combinations thereof. Those skilled in the art will appreciate the applicability of the IoT device sensors 208 to various aspects of the IoT services 114, and for this reason, additional details in this regard are not provided.

The security module 210 can include hardware, software, firmware, or some combination thereof. The security module 210 can be configured to handle cryptographic operations performed by the IoT device 104. For example, the security module 210 can store one or more cryptographic keys that are used by the IoT device 104 to perform various authentication operations, such as to establish a secure connection to other IoT devices 104, other devices, systems, networks, and/or the like.

The security module 210 can be a standalone component of the IoT device 104 as shown. Alternatively, the security module 210 can be integrated into another component of the IoT device 104, such as the IoT device processing component 200. In some embodiments, the security module 210 is part of an SoC that also includes, for example, the IoT device processing component 200, the IoT device memory component 202, and the IoT device communications component 212. The IoT device sensors 208 also may be integrated as part of the SoC.

The security module 210 can be uniquely identified by a security module identifier (shown as "SM ID") 216. The security module identifier 216 can be based on hardware of the IoT device 104, such as an identifier of the IoT device processing component 200 or another hardware component of the IoT device 104. The security module identifier 216 can be based on firmware. A combination of hardware and firmware can be used to further enhance security to prevent tampering (e.g., cloning) with the security module 210 such as cloning. The security module identifier 216 can be permanent and immutable.

The IoT device communications component 212 can include an RF transceiver or separate receiver and transmitter components. The IoT device communications component 212 can include one or more antennas and one or more RF receivers for receiving RF signals from and one or more RF transmitters for sending RF signals to other IoT devices 104 and/or the IMISP system 116. It is contemplated that the IoT device communications component 212 also may include a wired connection to a backbone network (not shown in FIG. 1).

The IoT device operating system 206 is shown having the IMISP operating system process 214. The IMISP operating system process 214 can be loaded on the IoT device 104 before the IoT device 104 is placed into service. Alternatively, the IMISP operating system process 214 can be loaded on the IoT device 104 after the IoT device 104 is placed into service, such as via a software update. In some embodiments, the IMISP operating system process 214 can be configured to keep at least one of a plurality of approved key sequences (e.g., a string of ones and zeroes). The IMISP operating system process 214 can change similar to a software virus and may move throughout the IoT device 104. By keeping at least one of the approved key sequences, no matter how the IMISP operating system process 214 alters itself, the IMISP operating system process 214 will be able to create at least one of the approved key sequences. When the IMISP 118 arrives at new host, the IMISP 118 can scan all files (e.g., similar to antivirus software) and once the IMISP 118 finds one of the approved key sequences, the IMISP 118 can recognize that this is the IMISP operating system process 214. A central authority (e.g., the IMISP system 116) can coordinate between the approved key sequences and the IMISP 118. The central authority can be in communications with the IMISP operating system process 214.

The IMISP operating system process 214 is designed to recognize the IMISP 118 and grant the IMSIP 118 root access to the IoT device 104. The IMISP operating system process 214 can include information about one or more IMISPs 118. After the IMISP 118 arrives at and is accessed by the IoT device 104, the IMISP 118 can contact the IMISP operating system process 214 running on the IoT device operating system 206. In response, the IMISP operating system process 214 can call the IMISP 118 to be executed to be self-installed. In some embodiments, the IMISP 118 and the IMISP operating system process 214 can each share a password and/or authentication information with the other for mutual authentication. Upon successful authentication, the IMISP 118 can be invoked by the IMISP operating system process 214 and can be allowed to run. The IMISP 118 can scan a plurality of memory locations 218A-218N of the IoT device memory component 202 to determine where the IMISP operating system process 214 is stored. The IMISP operating system process 214 can move through the IoT device memory component 202 to different memory locations 218. This movement can be designed based upon a timer, or can be random, or based upon some other scheme. After the IMISP 118 finds the IMISP operating system process 214 in a specific memory location (e.g., memory location 218A) of the plurality of memory locations 218, the IMISP 118 and the IMISP operating system process 214 can conduct a mutual authentication process in which authentication information is exchanged. In response to a successful result of the mutual authentication process, the IMISP 118 can self-install in the specific memory location (e.g., memory location 218A).

Figure 3:
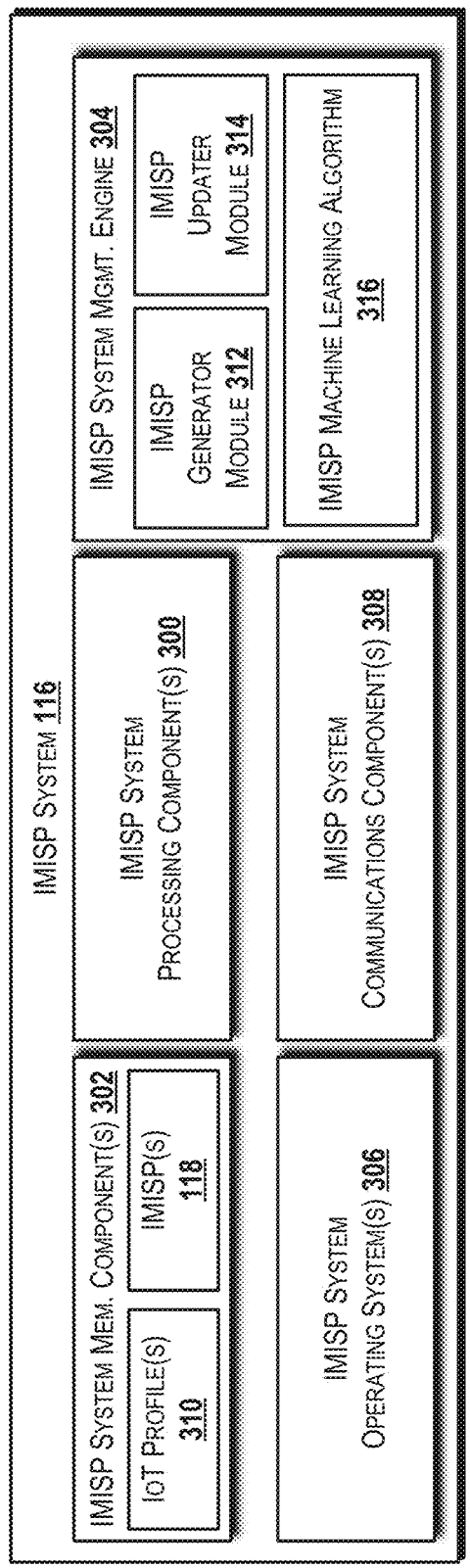
FIG. 3 is a block diagram illustrating an illustrative installable mutable intelligent security package ("IMISP") for various embodiments of the concepts and technologies disclosed herein.

Turning now to FIG. 3, a block diagram illustrating aspects of an example IMISP system 116 and components thereof capable of implementing aspects of the embodiments presented herein will be described. The illustrated IMISP system 116 includes one or more IMISP system processing components 300, one or more IMISP system memory components 302, an IMISP system management engine 304, one or more IMISP system operating systems 306, and one or more IMISP system communications components 308.

The IMISP system processing component 300 (also referred to herein as a "processor") can include one or more hardware components that perform computations to process data, and/or to execute computer-executable instructions of one or more application programs such as the IMISP system management engine 304, one or more operating systems such as the IMISP system operating system(s) 306, and/or other software. The IMISP system processing component 300 can include one or more CPUs configured with one or more processing cores. The IMISP system processing component 300 can include one or more GPU configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the IMISP system processing component 300 can include one or more discrete GPUs. In some other embodiments, the IMISP system processing component 300 can include CPU and GPU components that are configured in accordance with a co-processing CPU/GPU computing model, wherein the sequential part of an application executes on the CPU and the computationally-intensive part is accelerated by the GPU. The IMISP system processing component 300 can include one or more SoC components along with one or more other components illustrated as being part of the IMISP system 116 including, for example, the IMISP system memory component(s) 302. In some embodiments, the IMISP system processing component 300 can be or can include one or more SNAPDRAGON SoCs, available from QUALCOMM of San Diego, California; one or more TEGRA SoCs, available from NVIDIA of Santa Clara, California; one or more HUMMINGBIRD SoCs, available from SAMSUNG of Seoul, South Korea; one or more OMAP SoCs, available from TEXAS INSTRUMENTS of Dallas, Texas; one or more customized versions of any of the above SoCs; and/or one or more proprietary SoCs. The IMISP system processing component 300 can be or can include one or more hardware components architected in accordance with an ARM architecture, available for license from ARM HOLDINGS of Cambridge, United Kingdom. Alternatively, the IMISP system processing component 300 can be or can include one or more hardware components architected in accordance with an x86 architecture, such an architecture available from INTEL CORPORATION of Mountain View, California, and others. Those skilled in the art will appreciate the implementation of the IMISP system processing component 300 can utilize various computation architectures, and as such, the IMISP system processing component 300 should not be construed as being limited to any particular computation architecture or combination of computation architectures, including those explicitly disclosed herein.

The IMISP system memory component 302 can include one or more hardware components that perform storage operations, including temporary or permanent storage operations. In some embodiments, the IMISP system memory component 302 can include volatile and/or non-volatile memory implemented in any method or technology for storage of information such as computer-readable instructions, data structures, program modules, the IMISP system operating system 306, the IMISP system management engine 304, one or more IoT profiles 310, one or more IMISPs 118, and other data disclosed herein. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store data and which can be accessed by the IMISP system processing component 300.

The IMISP system management engine 304 can include an IMISP generator module 312, an IMISP updater module 314, and an IMISP machine learning algorithm 316. The IMISP generator module 312 can be executed by the IMISP system processing component 300 to generate the IMISP(s) 118. The IMISP updater module 314 can update the IMISP(s) 118 based upon feedback received from the IoT devices 104, such as in the IMISP report(s) 120. In some embodiments, the IMISP updater module 314 can leverage machine learning technologies by implementing the IMISP machine learning algorithm 316 to identify current data trends, predict future data trends, and otherwise analyze the data contained, for example, in the IMISP report(s) 120. This data can be used by the IMISP updater module 314 to update the IMISP(s) 118. Additional details about an illustrative embodiment of a machine learning system 1200 are described below with reference to FIG. 12.

The IMISP system operating system 306 can control the operation of the IMISP system 116. In some embodiments, the IMISP system operating system 306 includes the functionality of the IMISP system management engine 304. The IMISP system operating system 306 can be executed by the IMISP system processing component 300 to cause the IMISP system 116 to perform various operations. The IMISP system operating system 306 can include a member of the SYMBIAN OS family of operating systems from SYMBIAN LIMITED, a member of the WINDOWS OS, WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems or a member of the OS X family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The IMISP system communications component(s) 308 can include an RF transceiver or separate receiver and transmitter components. The IMISP system communications component(s) 308 can include one or more antennas and one or more RF receivers for receiving RF signals from and one or more RF transmitters for sending RF signals to the IoT network 102, such as to provide the IMISP(s) 118 to the IoT devices 104 and receive the IMISP reports 120 from the IoT devices 104.

Figure 4:
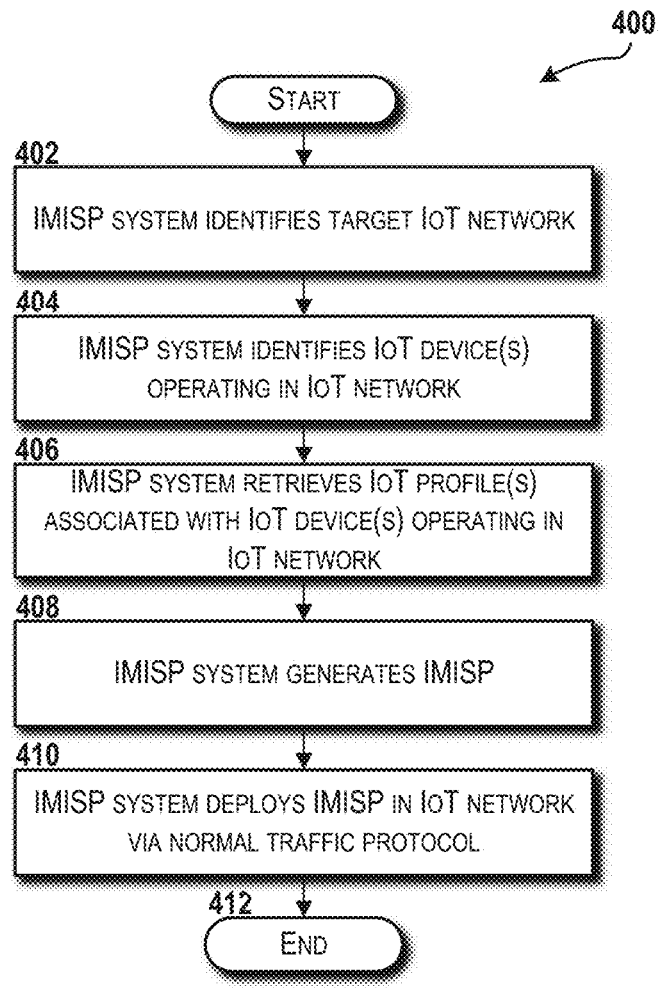
FIG. 4 is a flow diagram illustrating a method for creating an according to an illustrative embodiment.

Turning now to FIG. 4, a method 400 for creating an IMISP will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems or devices, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors, or components thereof, and/or one or more other computing systems, network components, and/or devices disclosed herein, and/or virtualizations thereof, to perform operations.

For purposes of illustrating and describing some of the concepts of the present disclosure, the methods will be described as being performed, at least in part, the IMISP system 116, the IoT device 104, and/or the IMISP 118. It should be understood that additional and/or alternative devices can provide the functionality described herein via execution of one or more modules, applications, and/or other software. Thus, the illustrated embodiments are illustrative, and should not be viewed as being limiting in any way.

The method 400 will be described with additional reference to FIG. 1. The method 400 begins and proceeds to operation 402. At operation 402, the IMISP system 116 identifies a target IoT network, such as the IoT network 102 shown in FIG. 1. The IMISP system 116 can provide an additional layer of security via the IMISPs 118 for any number of IoT networks. The IMISP system 116 can be provisioned to access the IoT network(s) 102 and the individual IoT devices 104 operating within. In some embodiments, the IMISP system 116 serves a single IoT network 102. This example will be used for the description of the method 400 and the other methods disclosed herein for ease of explanation and not limitation. Moreover, the local IMISP system 116A that serves a single IoT network 102 may report back to the remote IMISP system 116B such as shown in FIG. 1. In this manner, a centralized IMISP system (e.g., implemented as the remote IMISP system 116B) can learn, over time, and apply its learnings to other (child) IMISP systems (e.g., implemented as the local IMISP system 116A).

From operation 402, the method 400 proceeds to operation 404. At operation 404, the IMISP system 116 identifies the IoT device(s) 104 operating in the IoT network 102. In some embodiments, the IMISP operating system process 214 can scan the IoT device 104 for hardware information and can provide the hardware information to the IMISP system 116 for use in identifying the IoT device 104. The IMISP operating system process 214 may perform this operation in response to a request from the IMISP system 116, periodically, or otherwise as needed to allow the IMISP system 116 to identify the IoT device 104. From operation 404, the method 400 proceeds to operation 406. At operation 406, the IMISP system 116 retrieves the IoT profile(s) 310 associated with the IoT device(s) 104 operating in the IoT network 102.

From operation 406, the method 400 proceeds to operation 408. At operation 408, the IMISP system 116 generates the IMISP 118 based upon the IoT profile 310. From operation 408, the method 400 proceeds to operation 410. At operation 410, the IMISP system 116 deploys the IMISP 118 in the IoT network 102 via HTTP or FTP.

From operation 410, the method 400 proceeds to operation 412. The method 400 can end at operation 412.

Figure 5:
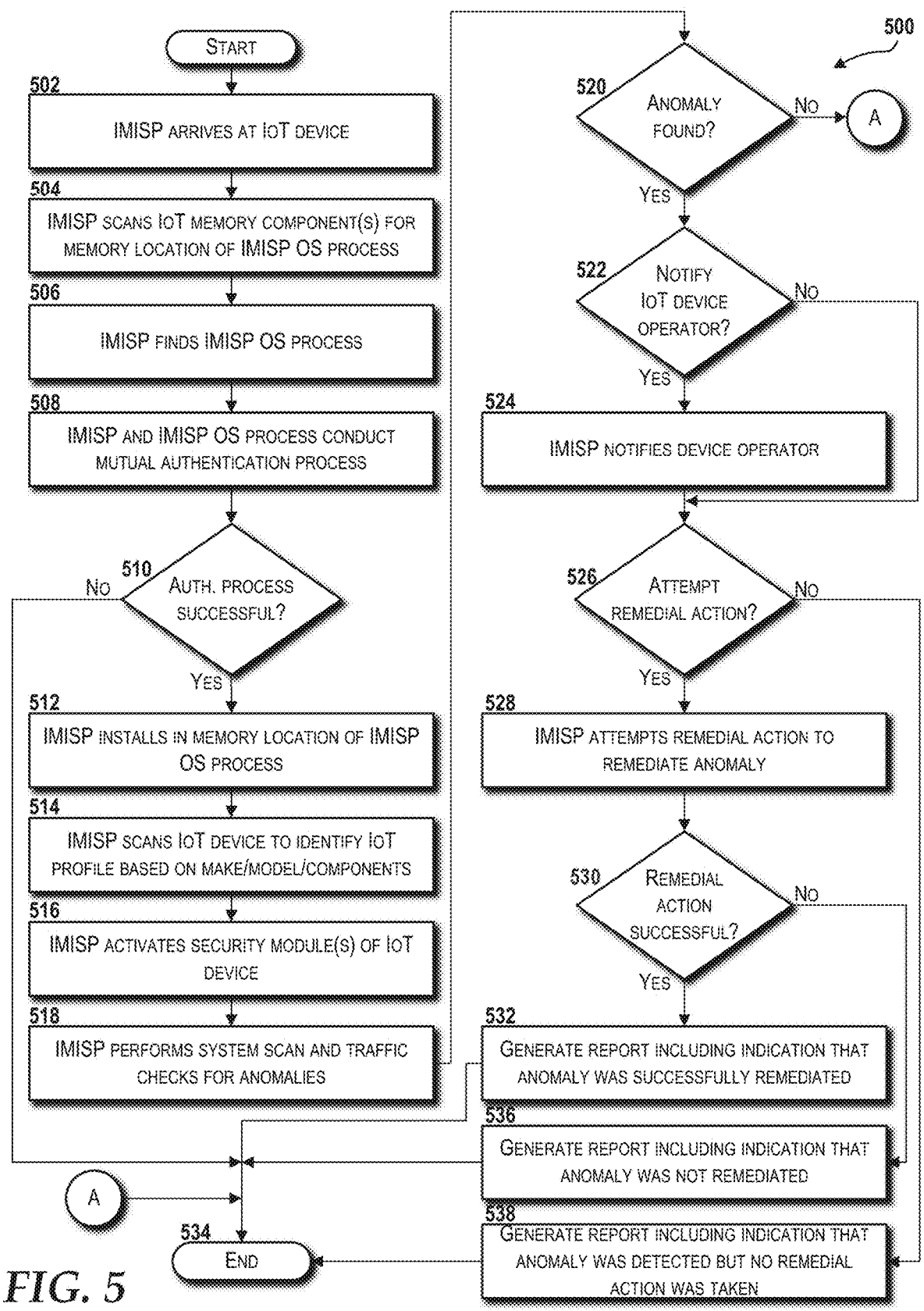
FIG. 5 is a flow diagram illustrating a method for installing an IMISP on an IoT device, according to an illustrative embodiment.

Turning now to FIG. 5, a method 500 for installing the IMISP 118 on the IoT device 104 will be described, according to an illustrative embodiment. The method 500 begins and proceeds to operation 502. At operation 502, the IMISP 118 arrives at the IoT device 104. From operation 502, the method 500 proceeds to operation 504. At operation 504, the IMISP 118 scans the IoT device memory component(s) 202 for the memory location 216 of the IMISP operating system process 214. From operation 504, the method 500 proceeds to operation 506. At operation 506, the IMISP 118 finds the IMISP operating system process 214.

From operation 506, the method 500 proceeds to operation 508. At operation 508, the IMISP 118 and the IMISP operating system process 214 conduct a mutual authentication process. From operation 508, the method 500 proceeds to operation 510. At operation 510, the IMISP 118 and the IMISP operating system process 214 determine if the mutual authentication process was successful. If the mutual authentication process was successful, the method 500 proceeds to operation 512. At operation 512, the IMISP 118 is granted root access to the IoT device 104 and installs in the memory location 218 of the IMISP operating system process 214. If the mutual authentication process was unsuccessful, the method 500 proceeds to operation 534. The method 500 can end at operation 534.

From operation 512, the method 500 proceeds to operation 514. At operation 514, the IMISP 118 scans the IoT device 104 to identify the IoT profile 310 based on the make, model, and/or specific components of the IoT device 104. From operation 514, the method 500 proceeds to operation 516. At operation 516, the IMISP 118 activates the security module 210 of the IoT device 104. The security module 210 can include specific information about the IoT device 104, such as what configuration(s) the IoT device 104 should/ should not have, the IoT device operating system 206 version, and/or which ports should be open/closed.

From operation 516, the method 500 proceeds to operation 518. At operation 518, the IMISP 118 performs a system scan and traffic checks for anomalies. The IMISP 118 has information about the IoT device(s) 104 on which it is to be installed. For example, the IMISP 118 can include baseline values, threshold values, and/or other information for each IoT type operating in the IoT network 102. This information can be based upon historic trends learned by the IMISP system 116. For example, the IoT device 104 implemented as part of a refrigeration system may include instructions to check whether a quantity of one or more food items is within an acceptable threshold.

From operation 518, the method 500 proceeds to operation 520. At operation 520, the IMISP 118 determines if an anomaly was found. If an anomaly was found, the method 500 proceeds to operation 522. At operation 522, the IMISP 118 determines if the IoT device operator should be notified of the anomaly. If so, the method 500 proceeds to operation 524. At operation 524, the IMISP 118 notifies the IoT device operator of the anomaly found in association with the IoT device 104. From operation 524, the method 500 proceeds to operation 526. Also, returning to operation 522, if the IMISP 118 determines that the IoT device 104 should not be notified of the anomaly, the method 500 proceeds directly to operation 526.

At operation 526, the IMISP 118 determines if remedial action should be attempted. The IMISP 118 can include information about what files should be installed on the IoT device 104, what IoT device operating system 206 and version thereof should be installed on the IoT device 104, in addition to what files and configurations that should not be present that could be harmful. The IMISP 118 can gain this knowledge by learning over time as to what is benign and what is harmful, or this knowledge can be deliberately programmed into the IMISP 118. Once a bad item is detected, the IMISP 118 can consult a resolution table that identifies the remedial action(s) to be taken.

If the IMISP 118 determines that remedial action should be attempted, the method 500 proceeds to operation 528. At operation 528, the IMISP 118 attempts remedial action to remedy the anomaly. The remedial action can be or can include any action to remedy, at least in part, the anomaly. For example, the remedial action can be or can include an action to remove/discard a file or application, command the IoT device 104 to request an updated version of the IoT device operating system 206, to command the IoT device 104 to request an update to the IoT device sensor(s) 208, such as a firmware update to more recent and secure version, and/or to close one or more vulnerable communication ports. These remedial actions are merely exemplary examples of some actions that can be taken by the IMISP 118 to remedy the anomaly. Those skilled in the art will appreciate that other remedial actions may be taken in an attempt to remedy a particular anomaly. As such, the examples provided herein should not be construed as being limiting in any way.

From operation 528, the method 500 proceeds to operation 530. At operation 530, the IMISP 118 determines if the remedial action was successful. The IMISP 118 can rescan after remediating the situation and see if the vulnerability still exists. For example, if the remedial action is for the IMISP 118 to discard/uninstall a bad application, when the IMISP 118 rescans the IoT device 104, the IMISP 118 can determine if the bad application still exists, and if so, the IMISP 118 can determine that the remedial action unsuccessful. If the IMISP 118 determines that the remedial action was successful, the method 500 proceeds to operation 532. At operation 532, the IMISP 118 generates the IMISP report 120 including an indication that the anomaly was successfully remediated. From operation 532, the method 500 proceeds to operation 534. The method 500 can end at operation 534. Returning to operation 530, if the IMISP 118 determines that the anomaly was not remediated, the method 500 proceeds to operation 536. At operation 536, the IMISP 118 generates the IMISP report 120 including an indication that the anomaly was not remediated. From operation 536, the method 500 proceeds to operation 534. The method 500 can end at operation 534.

Returning to operation 526, if the IMISP 118 determines that remedial action should not be attempted, the method 500 proceeds to operation 538. At operation 538, the IMISP 118 generates the IMISP report 120 including an indication that an anomaly was detected but no remedial action was taken. From operation 538, the method 500 proceeds to operation 534. The method 500 can end at operation 534.

Figure 6:
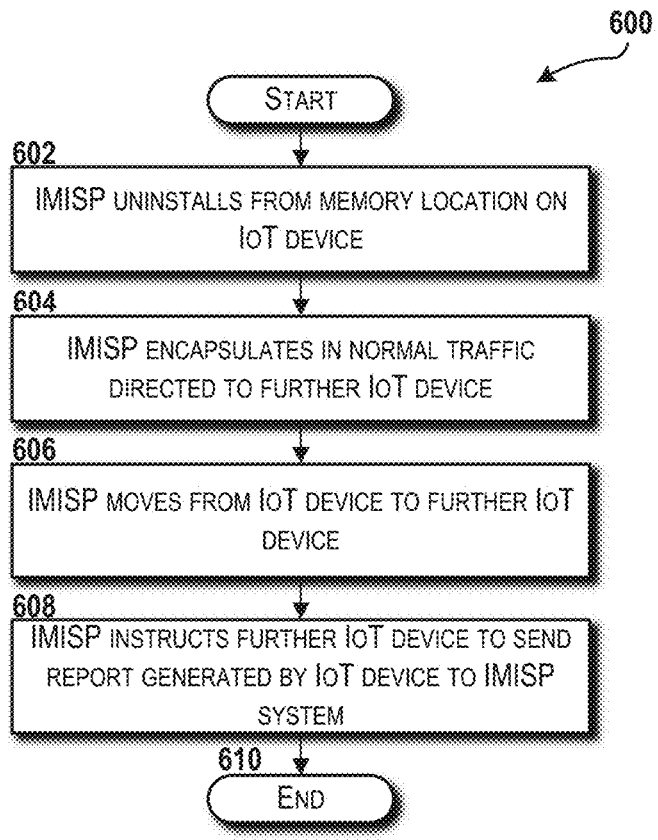
FIG. 6 is a flow diagram illustrating a method for an IMISP moving through an IoT network, according to an illustrative embodiment.

Turning now to FIG. 6, a method 600 for the IMISP 118 moving through the IoT network 102 will be described, according to an illustrative embodiment. The method 600 begins and proceeds to operation 602. At operation 602, the IMISP 118 self-uninstalls from the memory location 218 of the IoT device 104. From operation 602, the method 600 proceeds to operation 604. At operation 604, the IMISP 118 encapsulates itself in data traffic directed to a further IoT device (e.g., the IoT device$_1$ 104A to the IoT device$_2$ 104B). From operation 604, the method 600 proceeds to operation 606. At operation 606, the IMISP 118 moves from the IoT device$_1$ 104A to the IoT device$_2$ 104B.

From operation 606, the method 600 proceeds to operation 608. At operation 608, the IMISP 118 instructs the IoT device$_2$ 104B to send the IMISP report 120 generated by the IoT device$_1$ 104A to the IMISP system 116. From operation 608, the method 600 proceeds to operation 610. The method 600 can end at operation 610.

Figure 7:
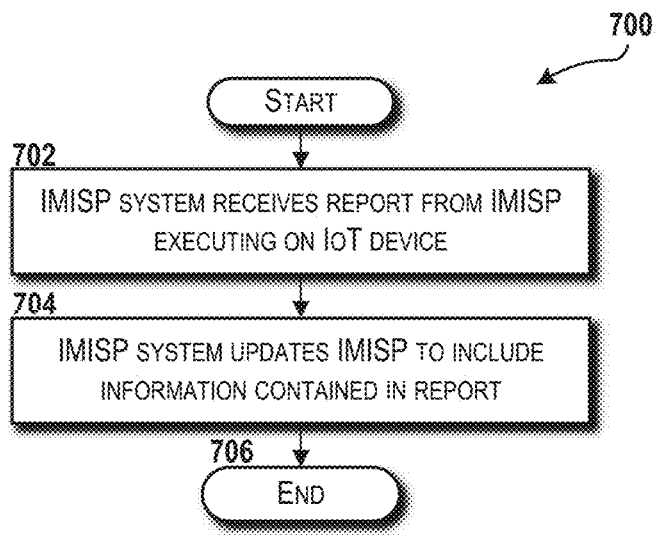
FIG. 7 is a flow diagram illustrating a method for updating an according to an illustrative embodiment.

Turning now to FIG. 7, a method 700 for updating the IMISP 118 will be described, according to an illustrative embodiment. The method 700 begins and proceeds to operation 702. At operation 702, the IMISP system 116 receives the IMISP report 120 from the IMISP 118 executing on the IoT device 104. From operation 702, the method 700 proceeds to operation 704. At operation 704, the IMISP system 116 updates the IMISP 118 to include information contained in the IMISP report 120. The IMISP report 120 can include the result of the scan, an indication of whether an anomaly was detected, and if so, whether the anomaly was remediated or not. The IMISP report 120 can include new trends/ranges based on the IoT device 104 being in operation for longer time, such as information regarding the number of operating hours that may affect the hardware quality/efficiency/accuracy (e.g., make the IoT device processing component 200 slower or the IoT device sensor 208 less accurate).

From operation 704, the method 700 proceeds to operation 706. The method 700 can end at operation 706.

Figure 8:
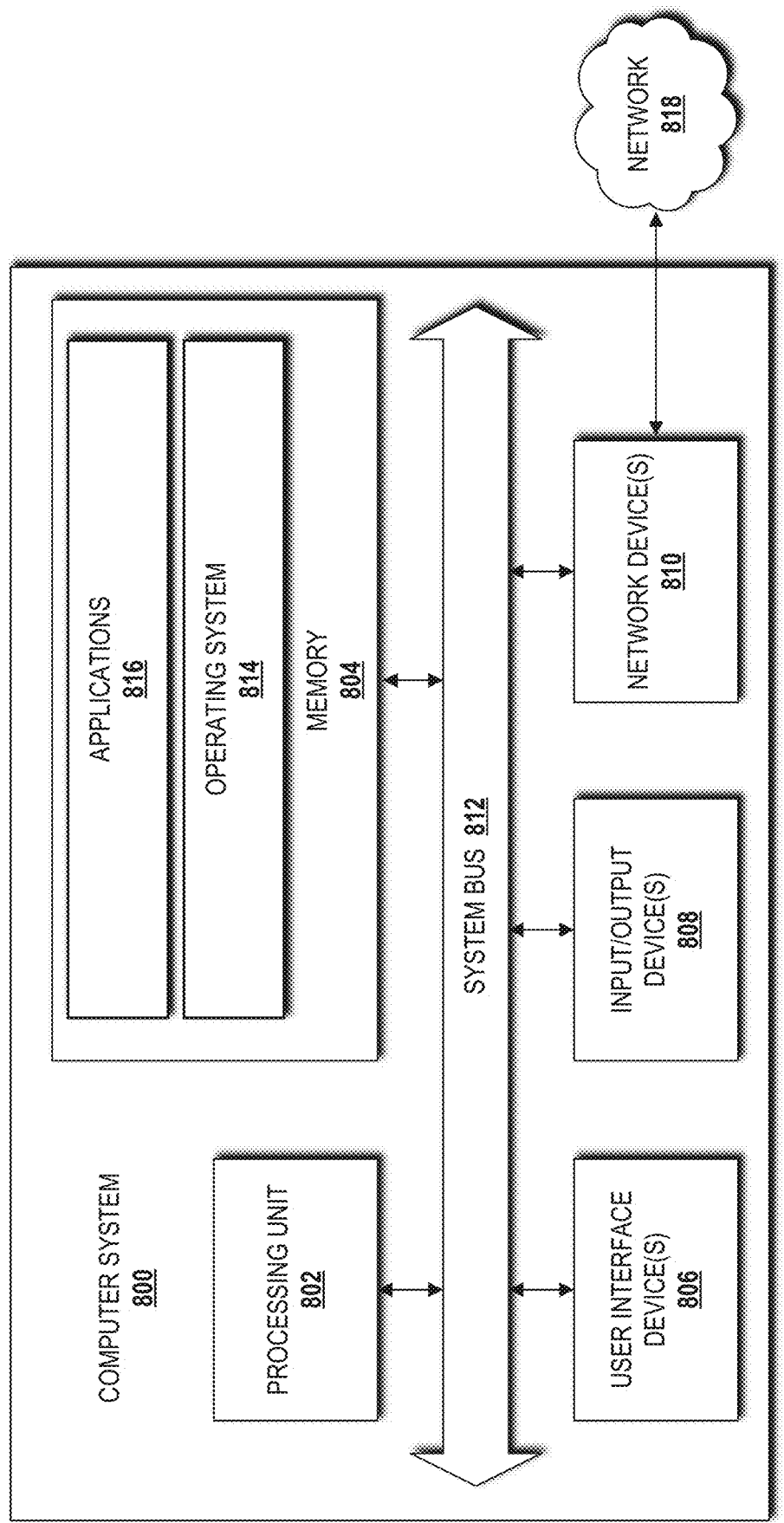
FIG. 8 is a block diagram illustrating an example computer system capable of implementing aspects of the embodiments presented herein.

Turning now to FIG. 8, a computer system 800 and components thereof will be described. An architecture similar to or the same as the computer system 800 can be used to implement various systems disclosed herein, such as the local IMISP system 116A, the remote IMISP system 116B, one or more systems utilized by the IoT service(s) 114, one or more systems operating on or in communication with the PDN(s) 112A-112N, one or more systems operating on or in communication with the core network 110, one or more systems operating on or in communication with the WWAN cellular access network 108, one or more systems operating on or in communication with the WWAN WI-FI access network 106, and/or other systems that can be used along with or in support of the concepts and technologies disclosed herein.

The computer system 800 includes a processing unit 802, a memory 804, one or more user interface devices 806, one or more input/output ("I/O") devices 808, and one or more network devices 810, each of which is operatively connected to a system bus 812. The system bus 812 enables bi-directional communication between the processing unit 802, the memory 804, the user interface devices 806, the I/O devices 808, and the network devices 810.

The processing unit 802 might be a standard central processor that performs arithmetic and logical operations, a more specific purpose programmable logic controller ("PLC"), a programmable gate array, or other type of processor known to those skilled in the art and suitable for controlling the operation of the computer system 800. Processing units are generally known, and therefore are not described in further detail herein.

The memory 804 communicates with the processing unit 802 via the system bus 812. In some embodiments, the memory 804 is operatively connected to a memory controller (not shown) that enables communication with the processing unit 802 via the system bus 812. The illustrated memory 804 includes an operating system 814 and one or more applications 816. The operating system 814 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 806 may include one or more devices with which a user accesses the computer system 800. The user interface devices 806 may include, but are not limited to, computers, servers, personal digital assistants, telephones (e.g., cellular, IP, or landline), or any suitable computing devices. The I/O devices 808 enable a user to interface with the program modules. In one embodiment, the I/O devices 808 are operatively connected to an I/O controller (not shown) that enables communication with the processing unit 802 via the system bus 812. The I/O devices 808 may include one or more input devices, such as, but not limited to, a keyboard, a mouse, a touchscreen, or an electronic stylus. Further, the I/O devices 808 may include one or more output devices, such as, but not limited to, a display screen or a printer. An I/O device 808 embodied as a display screen can be used to present information.

The network devices 810 enable the computer system 800 to communicate with a network 818, which can be or can include the WWAN WI-FI access network 106, the WWAN cellular network 108, the core network 110, the PDN(s) 112, or some combination thereof. Examples of the network devices 810 include, but are not limited to, a modem, a radio frequency ("RF") or infrared ("IR") transceiver, a telephonic interface, a bridge, a router, or a network card. The network 818 may include a wireless network such as, but not limited to, a WLAN such as a WI-FI network, a WWAN, a wireless PAN ("WPAN") such as BLUETOOTH, or a wireless MAN ("WMAN"). Alternatively, the network 818 may be a wired network such as, but not limited to, a WAN such as the Internet, a LAN such as the Ethernet, a wired PAN, or a wired MAN.

Figure 9:
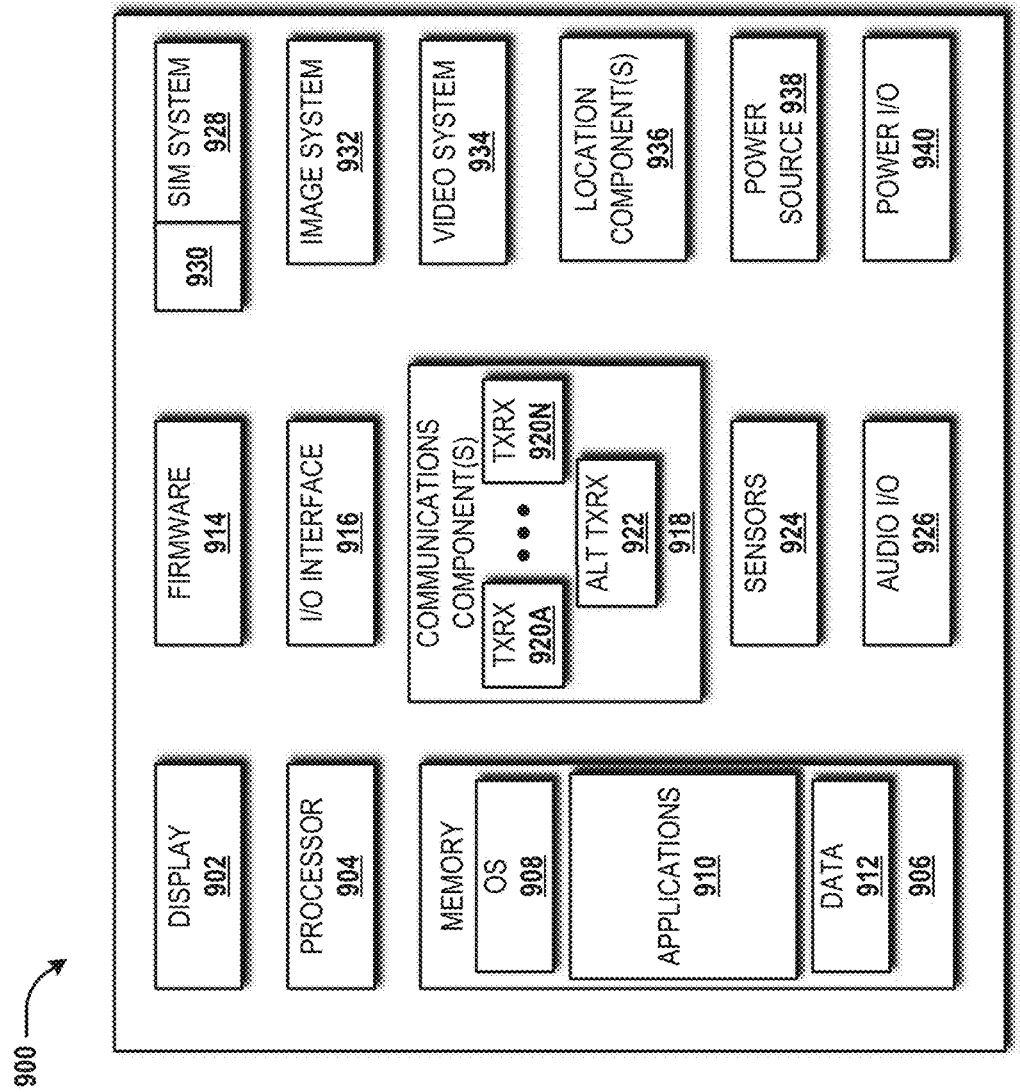
FIG. 9 is a block diagram illustrating an example mobile device capable of implementing aspects of the embodiments disclosed herein.

Turning now to FIG. 9, an illustrative mobile device 900 and components thereof will be described. While connections are not shown between the various components illustrated in FIG. 9, it should be understood that some, none, or all of the components illustrated in FIG. 9 can be configured to interact with one another to carry out various device functions. In some embodiments, the components are arranged so as to communicate via one or more busses (not shown). Thus, it should be understood that FIG. 9 and the following description are intended to provide a general understanding of a suitable environment in which various aspects of embodiments can be implemented, and should not be construed as being limiting in any way.

As illustrated in FIG. 9, the mobile device 900 can include a display 902 for displaying data. According to various embodiments, the display 902 can be configured to display various GUI elements, text, images, video, virtual keypads and/or keyboards, messaging data, notification messages, metadata, Internet content, device status, time, date, calendar data, device preferences, map and location data, combinations thereof, and/or the like. The mobile device 900 also can include a processor 904 and a memory or other data storage device ("memory") 906. The processor 904 can be configured to process data and/or can execute computer-executable instructions stored in the memory 906. The computer-executable instructions executed by the processor 904 can include, for example, an operating system 908, one or more applications 910, other computer-executable instructions stored in the memory 906, or the like. In some embodiments, the applications 910 also can include a UI application (not illustrated in FIG. 9).

The UI application can interface with the operating system 908 to facilitate user interaction with functionality and/or data stored at the mobile device 900 and/or stored elsewhere. In some embodiments, the operating system 908 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 904 to aid a user in entering/deleting data, entering and setting user IDs and passwords for device access, configuring settings, manipulating content and/or settings, multimode interaction, interacting with other applications 910, and otherwise facilitating user interaction with the operating system 908, the applications 910, and/or other types or instances of data 912 that can be stored at the mobile device 900.

The applications 910, the data 912, and/or portions thereof can be stored in the memory 906 and/or in a firmware 914, and can be executed by the processor 904. The firmware 914 also can store code for execution during device power up and power down operations. It can be appreciated that the firmware 914 can be stored in a volatile or non-volatile data storage device including, but not limited to, the memory 906 and/or a portion thereof.

The mobile device 900 also can include an input/output ("I/O") interface 916. The I/O interface 916 can be configured to support the input/output of data such as location information, presence status information, user IDs, passwords, and application initiation (start-up) requests. In some embodiments, the I/O interface 916 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 900 can be configured to synchronize with another device to transfer content to and/or from the mobile device 900. In some embodiments, the mobile device 900 can be configured to receive updates to one or more of the applications 910 via the I/O interface 916, though this is not necessarily the case. In some embodiments, the I/O interface 916 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 916 may be used for communications between the mobile device 900 and a network device or local device.

The mobile device 900 also can include a communications component 918. The communications component 918 can be configured to interface with the processor 904 to facilitate wired and/or wireless communications with one or more networks, such as the IoT network 102, the Internet, or some combination thereof. In some embodiments, the communications component 918 includes a multimode communications subsystem for facilitating communications via the cellular network and one or more other networks.

The communications component 918, in some embodiments, includes one or more transceivers. The one or more transceivers, if included, can be configured to communicate over the same and/or different wireless technology standards with respect to one another. For example, in some embodiments, one or more of the transceivers of the communications component 918 may be configured to communicate using Global System for Mobile communications ("GSM"), Code-Division Multiple Access ("CDMA") CDMAONE, CDMA2000, Long-Term Evolution ("LTE") LTE, and various other 2G, 2.5G, 3G, 4G, 4.5G, 5G, and greater generation technology standards. Moreover, the communications component 918 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiple Access ("OFDMA"), Space-Division Multiple Access ("SDMA"), and the like.

In addition, the communications component 918 may facilitate data communications using General Packet Radio Service ("GPRS"), Enhanced Data services for Global Evolution ("EDGE"), the High-Speed Packet Access ("HSPA") protocol family including High-Speed Downlink Packet Access ("HSDPA"), Enhanced Uplink ("EUL") (also referred to as High-Speed Uplink Packet Access ("HSUPA"), HSPA+, and various other current and future wireless data access standards. In the illustrated embodiment, the communications component 918 can include a first transceiver ("TxRx") 920A that can operate in a first communications mode (e.g., GSM). The communications component 918 also can include an $N^{th}$ transceiver ("TxRx") 920N that can operate in a second communications mode relative to the first transceiver 920A (e.g., UMTS). While two transceivers 920A-920N (hereinafter collectively and/or generically referred to as "transceivers 920") are shown in FIG. 9, it should be appreciated that less than two, two, and/or more than two transceivers 920 can be included in the communications component 918.

The communications component 918 also can include an alternative transceiver ("Alt TxRx") 922 for supporting other types and/or standards of communications. According to various contemplated embodiments, the alternative transceiver 922 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 918 also can facilitate reception from terrestrial radio networks, digital satellite radio networks, internet-based radio service networks, combinations thereof, and the like. The communications component 918 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 900 also can include one or more sensors 924. The sensors 924 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 900 may be provided by an audio I/O component 926. The audio I/O component 926 of the mobile device 900 can include one or more speakers for the output of audio signals, one or more microphones for the collection and/or input of audio signals, and/or other audio input and/or output devices.

The illustrated mobile device 900 also can include a subscriber identity module ("SIM") system 928. The SIM system 928 can include a universal SIM ("USIM"), a universal integrated circuit card ("UICC") and/or other identity devices. The SIM system 928 can include and/or can be connected to or inserted into an interface such as a slot interface 930. In some embodiments, the slot interface 930 can be configured to accept insertion of other identity cards or modules for accessing various types of networks. Additionally, or alternatively, the slot interface 930 can be configured to accept multiple subscriber identity cards. Because other devices and/or modules for identifying users and/or the mobile device 900 are contemplated, it should be understood that these embodiments are illustrative, and should not be construed as being limiting in any way.

The mobile device 900 also can include an image capture and processing system 932 ("image system"). The image system 932 can be configured to capture or otherwise obtain photos, videos, and/or other visual information. As such, the image system 932 can include cameras, lenses, charge-coupled devices ("CCDs"), combinations thereof, or the like. The mobile device 900 may also include a video system 934. The video system 934 can be configured to capture, process, record, modify, and/or store video content. Photos and videos obtained using the image system 932 and the video system 934, respectively, may be added as message content to an MMS message, email message, and sent to another device. The video and/or photo content also can be shared with other devices via various types of data transfers via wired and/or wireless communication devices as described herein.

The mobile device 900 also can include one or more location components 936. The location components 936 can be configured to send and/or receive signals to determine a geographic location of the mobile device 900. According to various embodiments, the location components 936 can send and/or receive signals from global positioning system ("GPS") devices, assisted-GPS ("A-GPS") devices, WI-FI/WIMAX and/or cellular network triangulation data, combinations thereof, and the like. The location component 936 also can be configured to communicate with the communications component 918 to retrieve triangulation data for determining a location of the mobile device 900. In some embodiments, the location component 936 can interface with cellular network nodes, telephone lines, satellites, location transmitters and/or beacons, wireless network transmitters and receivers, combinations thereof, and the like. In some embodiments, the location component 936 can include and/or can communicate with one or more of the sensors 924 such as a compass, an accelerometer, and/or a gyroscope to determine the orientation of the mobile device 900. Using the location component 936, the mobile device 900 can generate and/or receive data to identify its geographic location, or to transmit data used by other devices to determine the location of the mobile device 900. The location component 936 may include multiple components for determining the location and/or orientation of the mobile device 900.

The illustrated mobile device 900 also can include a power source 938. The power source 938 can include one or more batteries, power supplies, power cells, and/or other power subsystems including alternating current ("AC") and/or direct current ("DC") power devices. The power source 938 also can interface with an external power system or charging equipment via a power I/O component 940. Because the mobile device 900 can include additional and/or alternative components, the above embodiment should be understood as being illustrative of one possible operating environment for various embodiments of the concepts and technologies described herein. The described embodiment of the mobile device 900 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 900 or other devices or computers described herein, such as the computer system 800 described above with reference to FIG. 8. In the claims, the phrase "computer storage medium," "computer-readable storage medium," and variations thereof does not include waves or signals per se and/or communication media, and therefore should be construed as being directed to "non-transitory" media only.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 900 in order to store and execute the software components presented herein. It is also contemplated that the mobile device 900 may not include all of the components shown in FIG. 9, may include other components that are not explicitly shown in FIG. 9, or may utilize an architecture completely different than that shown in FIG. 9.

Turning now to FIG. 10, details of a network 1000 are illustrated, according to an illustrative embodiment. The network 1000 includes a cellular network 1002, a packet data network 1004, and a circuit switched network 1006 (e.g., a public switched telephone network).

The cellular network 1002 can include the WWAN cellular access network 108 and the core network 110. In some implementations, the radio access capabilities of the cellular network 1002 can include the WWAN WI-FI access network 106. The cellular network 1002 includes various components such as, but not limited to, base transceiver stations ("BTSs"), Node-Bs or e-Node-Bs, base station controllers ("BSCs"), radio network controllers ("RNCs"), mobile switching centers ("MSCs"), mobility management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, and the like. The cellular network 1002 also includes radios and nodes for receiving and transmitting voice, data, and combinations thereof to and from radio transceivers, networks, the packet data network 1004, and the circuit switched network 1006.

A mobile communications device 1008, such as, for example, a cellular telephone, a user equipment, a mobile terminal, a PDA, a laptop computer, a handheld computer, and combinations thereof, can be operatively connected to the cellular network 1002. The mobile communications device 1008 can be configured similar to or the same as the mobile device 900 described above with reference to FIG. 9.

The cellular network 1002 can be configured as a GSM) network and can provide data communications via GPRS and/or EDGE. Additionally, or alternatively, the cellular network 1002 can be configured as a 3G Universal Mobile Telecommunications System ("UMTS") network and can provide data communications via the HSPA protocol family, for example, HSDPA, EUL, and HSPA+. The cellular network 1002 also is compatible with 4G mobile communications standards such as LTE, or the like, as well as evolved and future mobile standards.

The packet data network 1004 includes various systems, devices, servers, computers, databases, and other devices in communication with one another, as is generally known. In some embodiments, the packet data network 1004 is or includes one or more WI-FI networks, each of which can include one or more WI-FI access points, routers, switches, and other WI-FI network components. The packet data network 1004 devices are accessible via one or more network links. The servers often store various files that are provided to a requesting device such as, for example, a computer, a terminal, a smartphone, or the like. Typically, the requesting device includes software for executing a web page in a format readable by the browser or other software. Other files and/or data may be accessible via "links" in the retrieved files, as is generally known. In some embodiments, the packet data network 1004 includes or is in communication with the Internet. The packet data network 1004 can be or can include one or more of the PDNs 112A-112N. The circuit switched network 1006 includes various hardware and software for providing circuit switched communications. The circuit switched network 1006 may include, or may be, what is often referred to as a plain old telephone system ("POTS"). The functionality of a circuit switched network 1006 or other circuit-switched network are generally known and will not be described herein in detail.

The illustrated cellular network 1002 is shown in communication with the packet data network 1004 and a circuit switched network 1006, though it should be appreciated that this is not necessarily the case. One or more Internet-capable devices 1010 such as one or more of the IoT devices 104, one or more IMISP systems 116, a laptop, a portable device, or another suitable device, can communicate with one or more cellular networks 1002, and devices connected thereto, through the packet data network 1004. It also should be appreciated that the Internet-capable device 1010 can communicate with the packet data network 1004 through the circuit switched network 1006, the cellular network 1002, and/or via other networks (not illustrated).

As illustrated, a communications device 1012, for example, a telephone, facsimile machine, modem, computer, or the like, can be in communication with the circuit switched network 1006, and therethrough to the packet data network 1004 and/or the cellular network 1002. It should be appreciated that the communications device 1012 can be an Internet-capable device, and can be substantially similar to the Internet-capable device 1010.

Figure 11:
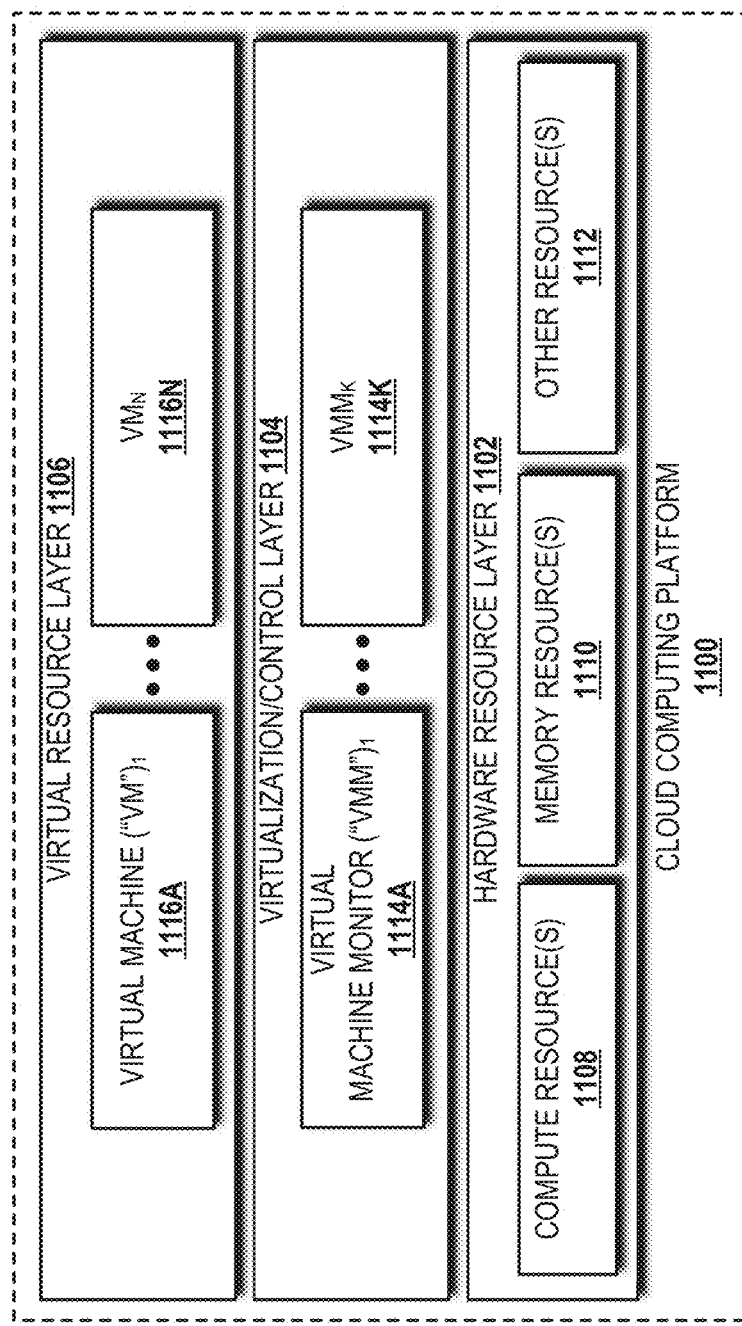
FIG. 11 is a diagram illustrating a cloud computing platform capable of implementing aspects of the embodiments disclosed herein.

Turning now to FIG. 11, a cloud computing platform 1100 will be described, according to an exemplary embodiment. The architecture of the cloud computing platform 1100 can be utilized to implement various elements disclosed herein. The cloud computing platform 1100 is a shared infrastructure that can support multiple services and network applications. The illustrated cloud computing platform 1100 includes a hardware resource layer 1102, a virtualization/control layer 1104, and a virtual resource layer 1106 that work together to perform operations as will be described in detail herein.

The hardware resource layer 1102 provides hardware resources, which, in the illustrated embodiment, include one or more compute resources 1108, one or more memory resources 1110, and one or more other resources 1112. The compute resource(s) 1108 can include one or more hardware components that perform computations to process data, and/or to execute computer-executable instructions of one or more application programs, operating systems, and/or other software. The compute resources 1108 can include one or more central processing units ("CPUs") configured with one or more processing cores. The compute resources 1108 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 1108 can include one or more discrete GPUs. In some other embodiments, the compute resources 1108 can include CPU and GPU components that are configured in accordance with a co-processing CPU/GPU computing model, wherein the sequential part of an application executes on the CPU and the computationally-intensive part is accelerated by the GPU. The compute resources 1108 can include one or more system-on-chip ("SoC") components along with one or more other components, including, for example, one or more of the memory resources 1110, and/or one or more of the other resources 1112. In some embodiments, the compute resources 1108 can be or can include one or more SNAPDRAGON SoCs, available from QUALCOMM of San Diego, California; one or more TEGRA SoCs, available from NVIDIA of Santa Clara, California; one or more HUMMINGBIRD SoCs, available from SAMSUNG of Seoul, South Korea; one or more Open Multimedia Application Platform ("OMAP") SoCs, available from TEXAS INSTRUMENTS of Dallas, Texas; one or more customized versions of any of the above SoCs; and/or one or more proprietary SoCs. The compute resources 1108 can be or can include one or more hardware components architected in accordance with an advanced reduced instruction set computing ("RISC") ("ARM") architecture, available for license from ARM HOLDINGS of Cambridge, United Kingdom. Alternatively, the compute resources 1108 can be or can include one or more hardware components architected in accordance with an x86 architecture, such an architecture available from INTEL CORPORATION of Mountain View, California, and others. Those skilled in the art will appreciate the implementation of the compute resources 1108 can utilize various computation architectures, and as such, the compute resources 1108 should not be construed as being limited to any particular computation architecture or combination of computation architectures, including those explicitly disclosed herein.

The memory resource(s) 1110 can include one or more hardware components that perform storage operations, including temporary or permanent storage operations. In some embodiments, the memory resource(s) 1110 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 1108.

The other resource(s) 1112 can include any other hardware resources that can be utilized by the compute resources(s) 1108 and/or the memory resource(s) 1110 to perform operations described herein. The other resource(s) 1112 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 1102 can be virtualized by one or more virtual machine monitors ("VMMs") 1114A-1114K (also known as "hypervisors;" hereinafter "VMMs 1114") operating within the virtualization/control layer 1104 to manage one or more virtual resources that reside in the virtual resource layer 1106. The VMMs 1114 can be or can include software, firmware, and/or hardware that alone or in combination with other software, firmware, and/or hardware, manages one or more virtual resources operating within the virtual resource layer 1106.

The virtual resources operating within the virtual resource layer 1106 can include abstractions of at least a portion of the compute resources 1108, the memory resources 1110, the other resources 1112, or any combination thereof. These abstractions are referred to herein as VMs. In the illustrated embodiment, the virtual resource layer 1106 includes VMs 1116A-1116N (hereinafter "VMs 1116"). Each of the VMs 1116 can execute one or more applications to perform the operations described herein.

Figure 12:
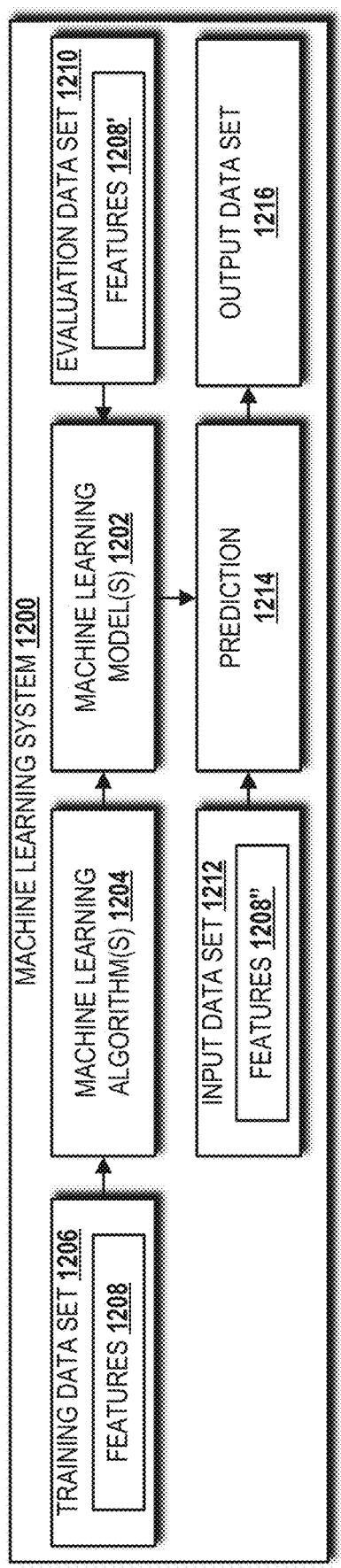
FIG. 12 is a diagram illustrating a machine learning system, according to an illustrative embodiment.

Turning now to FIG. 12, a machine learning system 1200 capable of implementing aspects of the embodiments disclosed herein will be described. In some embodiments, the IMISP system 116 can utilize the machine learning system 1200 to implement the IMISP machine learning algorithm 316. The IMISP system 116 may include the machine learning system 1200 or may communicate with the machine learning system 1200 that is operating remotely from the IMISP system 116.

The illustrated machine learning system 1200 includes one or more machine learning models 1202. The machine learning models 1202 can include supervised and/or semi-supervised learning models. The machine learning model(s) 1202 can be created by the machine learning system 1200 based upon one or more machine learning algorithms 1204, such as the IMISP machine learning algorithm 316. The machine learning algorithm(s) 1204 can be any existing, well-known algorithm, any proprietary algorithms, or any future machine learning algorithm. Some example machine learning algorithms 1204 include, but are not limited to, gradient descent, linear regression, logistic regression, linear discriminant analysis, classification tree, regression tree, Naive Bayes, K-nearest neighbor, learning vector quantization, support vector machines, and the like. Classification and regression algorithms might find particular applicability to the concepts and technologies disclosed herein. Those skilled in the art will appreciate the applicability of various machine learning algorithms 1204 based upon the problem(s) to be solved by machine learning via the machine learning system 1200.

The machine learning system 1200 can control the creation of the machine learning models 1202 via one or more training parameters. In some embodiments, the training parameters are selected modelers at the direction of an enterprise, for example. Alternatively, in some embodiments, the training parameters are automatically selected based upon data provided in one or more training data sets 1206. The training parameters can include, for example, a learning rate, a model size, a number of training passes, data shuffling, regularization, and/or other training parameters known to those skilled in the art. The training data in the training data sets 1206.

The learning rate is a training parameter defined by a constant value. The learning rate affects the speed at which the machine learning algorithm 1204 converges to the optimal weights. The machine learning algorithm 1204 can update the weights for every data example included in the training data set 1206. The size of an update is controlled by the learning rate. A learning rate that is too high might prevent the machine learning algorithm 1204 from converging to the optimal weights. A learning rate that is too low might result in the machine learning algorithm 1204 requiring multiple training passes to converge to the optimal weights.

The model size is regulated by the number of input features ("features") 1208 in the training data set 1206. A greater the number of features 1208 yields a greater number of possible patterns that can be determined from the training data set 1206. The model size should be selected to balance the resources (e.g., compute, memory, storage, etc.) needed for training and the predictive power of the resultant machine learning model 1202.

The number of training passes indicates the number of training passes that the machine learning algorithm 1204 makes over the training data set 1206 during the training process. The number of training passes can be adjusted based, for example, on the size of the training data set 1206, with larger training data sets being exposed to fewer training passes in consideration of time and/or resource utilization. The effectiveness of the resultant machine learning model 1202 can be increased by multiple training passes.

Data shuffling is a training parameter designed to prevent the machine learning algorithm 1204 from reaching false optimal weights due to the order in which data contained in the training data set 1206 is processed. For example, data provided in rows and columns might be analyzed first row, second row, third row, etc., and thus an optimal weight might be obtained well before a full range of data has been considered. By data shuffling, the data contained in the training data set 1206 can be analyzed more thoroughly and mitigate bias in the resultant machine learning model 1202.

Regularization is a training parameter that helps to prevent the machine learning model 1202 from memorizing training data from the training data set 1206. In other words, the machine learning model 1202 fits the training data set 1206, but the predictive performance of the machine learning model 1202 is not acceptable. Regularization helps the machine learning system 1200 avoid this overfitting/memorization problem by adjusting extreme weight values of the features 1208. For example, a feature that has a small weight value relative to the weight values of the other features in the training data set 1206 can be adjusted to zero.

The machine learning system 1200 can determine model accuracy after training by using one or more evaluation data sets 1210 containing the same features 1208' as the features 1208 in the training data set 1206. This also prevents the machine learning model 1202 from simply memorizing the data contained in the training data set 1206. The number of evaluation passes made by the machine learning system 1200 can be regulated by a target model accuracy that, when reached, ends the evaluation process and the machine learning model 1202 is considered ready for deployment.

After deployment, the machine learning model 1202 can perform a prediction operation ("prediction") 1214 with an input data set 1212 having the same features 1208" as the features 1208 in the training data set 1206 and the features 1208' of the evaluation data set 1210. The results of the prediction 1214 are included in an output data set 1216 consisting of predicted data. The machine learning model 1202 can perform other operations, such as regression, classification, and others. As such, the example illustrated in FIG. 12 should not be construed as being limiting in any way.

Based on the foregoing, it should be appreciated that concepts and technologies for an IMISP and security system in IoT networks have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

The invention claimed is:

1. A method comprising:
receiving, by an Internet of Things device comprising a processor and a memory, an installable mutable intelligent security package that is executable by the processor;
scanning, by the installable mutable intelligent security package, a plurality of memory locations of the memory for an installable mutable intelligent security package operating system process;
in response to finding the installable mutable intelligent security package operating system process in a memory location of the plurality of memory locations, conducting a mutual authentication process between the installable mutable intelligent security package and the installable mutable intelligent security package operating system process;
in response to a successful result of the mutual authentication process, self-installing the installable mutable intelligent security package in the memory location;
scanning, by the installable mutable intelligent security package, the Internet of Things device for an anomaly;
in response to finding an anomaly, determining, by the installable mutable intelligent security package, if a remedial action to remediate the anomaly should be attempted;
in response to determining that a remedial action to remediate the anomaly should be attempted,
attempting, by the installable mutable intelligent security package, the remedial action to remediate the anomaly,
in response to determining that the remedial action was successful, generating, by the installable mutable intelligent security package, a report comprising an indication that the anomaly was remediated, and
in response to determining that the remedial action was unsuccessful, generating, by the installable mutable intelligent security package, a report comprising an indication that the anomaly was not remediated; and
in response to determining that a remedial action to remediate the anomaly should not be attempted, generating, by the installable mutable intelligent security package, a report comprising an indication that the anomaly was detected but the remedial action was not taken.

2. The method of claim 1, further comprising:
self-uninstalling, by the installable mutable intelligent security package, the installable mutable intelligent security package from the memory location of the Internet of Things device;
encapsulating, by the installable mutable intelligent security package, the installable mutable intelligent security package in traffic directed to a further Internet of Things device; and
moving, by the installable mutable intelligent security package, amongst the traffic, the installable mutable intelligent security package from the Internet of Things device to the further Internet of Things device.

3. The method of claim 2, further comprising upon arrival of the installable mutable intelligent security package at the further Internet of Things device, instructing, by the installable mutable intelligent security package, the further Internet of Things device to send one of the report comprising an indication that the anomaly was successfully remediated, the report comprising an indication that the anomaly was not remediated, or the report comprising an indication that the anomaly was detected but the remedial action was not taken to an installable mutable intelligent security package system.

4. The method of claim 1, wherein the installable mutable intelligent security package is received from an installable mutable intelligent security package system operating external to an Internet of Things network, and wherein the Internet of Things network comprises a plurality of Internet of Things devices including the Internet of Things device.

5. The method of claim 4, wherein the installable mutable intelligent security package is generated by the installable mutable intelligent security package system based on a profile of the Internet of Things device.

6. The method of claim 4, wherein the installable mutable intelligent security package is received via a hypertext transfer protocol or file transfer protocol from the installable mutable intelligent security package system operating external to the Internet of Things network.

7. The method of claim 1, further comprising:
determining, by the installable mutable intelligent security package, if an Internet of Things device operator associated with the Internet of Things device should be notified of the anomaly; and
in response to determining that the Internet of Things device operator associated with the Internet of Things device should be notified of the anomaly, notifying, by the installable mutable intelligent security package, the Internet of Things device operator of the anomaly.

8. An Internet of Things device comprising:
a processor; and
a memory comprising instructions that, when executed by the processor, cause the processor to perform operations comprising
receiving an installable mutable intelligent security package that is executable by the processor,
scanning, by the installable mutable intelligent security package, a plurality of memory locations of the memory for an installable mutable intelligent security package operating system process,
in response to finding the installable mutable intelligent security package operating system process in a memory location of the plurality of memory locations, conducting a mutual authentication process between the installable mutable intelligent security package and the installable mutable intelligent security package operating system process, in response to a successful result of the mutual authentication process, self-installing the installable mutable intelligent security package in the memory location, scanning, by the installable mutable intelligent security package, the Internet of Things device for an anomaly, in response to finding the anomaly, generating, by the installable mutable intelligent security package, a report comprising information associated with the anomaly, self-uninstalling, by the installable mutable intelligent security package, the installable mutable intelligent security package from the memory location of the Internet of Things device, encapsulating, by the installable mutable intelligent security package, the installable mutable intelligent security package in traffic directed to a further Internet of Things device, and moving, by the installable mutable intelligent security package, amongst the traffic, the installable mutable intelligent security package from the Internet of Things device to the further Internet of Things device, wherein the installable mutable intelligent security package instructs the further Internet of Things device to send the report to an installable mutable intelligent security package system when the installable mutable intelligent security package arrives at the further Internet of Things device.

9. The Internet of Things device of claim 8, wherein the operations further comprise connecting to an Internet of Things network comprising a plurality of Internet of Things devices, wherein receiving the installable mutable intelligent security package comprises receiving the installable mutable intelligent security package from the installable mutable intelligent security package system, and wherein the installable mutable intelligent security package system operates external to the Internet of Things network.

10. The Internet of Things device of claim 9, wherein the installable mutable intelligent security package is received via a hypertext transfer protocol or file transfer protocol from the installable mutable intelligent security package system.

11. The Internet of Things device of claim 8, wherein the installable mutable intelligent security package is generated by the installable mutable intelligent security package system based on a profile of the Internet of Things device.

12. The Internet of Things device of claim 8, wherein the operations further comprise:
determining, by the installable mutable intelligent security package, if an Internet of Things device operator associated with the Internet of Things device should be notified of the anomaly; and
in response to determining that the Internet of Things device operator associated with the Internet of Things device should be notified of the anomaly, notifying, by the installable mutable intelligent security package, the Internet of Things device operator of the anomaly.

13. The Internet of Things device of claim 8, wherein the operations further comprise:

in response to finding the anomaly, determining, by the installable mutable intelligent security package, if a remedial action to remediate the anomaly should be attempted;

in response to determining that a remedial action to remediate the anomaly should be attempted, attempting, by the installable mutable intelligent security package, the remedial action to remediate the anomaly, wherein the information associated with the anomaly of the report comprises an indication that the anomaly was remediated in response to determining that the remedial action was successful or an indication that the anomaly was not remediated in response to determining that the remedial action was unsuccessful; and in response to determining that a remedial action to remediate the anomaly should not be attempted, generating, by the installable mutable intelligent security package, the report comprising the information associated with the anomaly, wherein the information associated with the anomaly of the report comprises an indication that the anomaly was detected but the remedial action was not taken.

14. The Internet of Things device of claim 8, wherein scanning the Internet of Things device for an anomaly comprises performing a system scan and traffic checks for an anomaly.

15. A computer-readable storage medium comprising computer-executable instructions of an installable mutable intelligent security package that, when executed by a processor of an Internet of Things device, cause the Internet of Things device to perform operations comprising:

scanning a plurality of memory locations of a memory of the Internet of Things device for an installable mutable intelligent security package operating system process;

in response to finding the installable mutable intelligent security package operating system process in a memory location of the plurality of memory locations, conducting a mutual authentication process between the installable mutable intelligent security package and the installable mutable intelligent security package operating system process;

in response to a successful result of the mutual authentication process, self-installing the installable mutable intelligent security package in the memory location;

scanning the Internet of Things device for an anomaly;

in response to finding the anomaly, generating a report comprising information associated with the anomaly;

self-uninstalling the installable mutable intelligent security package from the memory location of the Internet of Things device;

encapsulating the installable mutable intelligent security package in traffic directed to a further Internet of Things device; and moving, amongst the traffic, the installable mutable intelligent security package from the Internet of Things device to the further Internet of Things device, wherein the installable mutable intelligent security package instructs the further Internet of Things device to send the report to an installable mutable intelligent security package system when the installable mutable intelligent security package arrives at the further Internet of Things device.

16. The computer-readable storage medium of claim 15, wherein the operations further comprise connecting to an Internet of Things network comprising a plurality of Internet of Things devices, wherein receiving the installable mutable intelligent security package comprises receiving the installable mutable intelligent security package from the installable mutable intelligent security package system, and wherein the installable mutable intelligent security package system operates external to the Internet of Things network.

17. The computer-readable storage medium of claim 16, wherein the installable mutable intelligent security package is received via a hypertext transfer protocol or file transfer protocol from the installable mutable intelligent security package system.

18. The computer-readable storage medium of claim 15, wherein the installable mutable intelligent security package is generated by the installable mutable intelligent security package system based on a profile of the Internet of Things device.

19. The computer-readable storage medium of claim 15, wherein the operations further comprise:
   determining, by the installable mutable intelligent security package, if an Internet of Things device operator associated with the Internet of Things device should be notified of the anomaly; and
   in response to determining that the Internet of Things device operator associated with the Internet of Things device should be notified of the anomaly, notifying, by the installable mutable intelligent security package, the Internet of Things device operator of the anomaly.

20. The computer-readable storage medium of claim 15, wherein the operations further comprise:
   in response to finding the anomaly, determining, by the installable mutable intelligent security package, if a remedial action to remediate the anomaly should be attempted;
   in response to determining that a remedial action to remediate the anomaly should be attempted, attempting, by the installable mutable intelligent security package, the remedial action to remediate the anomaly, wherein the information associated with the anomaly of the report comprises an indication that the anomaly was remediated in response to determining that the remedial action was successful or an indication that the anomaly was not remediated in response to determining that the remedial action was unsuccessful; and
   in response to determining that a remedial action to remediate the anomaly should not be attempted, generating, by the installable mutable intelligent security package, the report comprising the information associated with the anomaly, wherein the information associated with the anomaly of the report comprises an indication that the anomaly was detected but the remedial action was not taken.

\* \* \* \* \*